US011072403B2

(12) United States Patent
Cheong et al.

(10) Patent No.: US 11,072,403 B2
(45) Date of Patent: Jul. 27, 2021

(54) SHIP DATA CONSOLIDATED MANAGEMENT METHOD AND DEVICE

(71) Applicant: Hyundai Heavy Industries Co., Ltd., Ulsan (KR)

(72) Inventors: Young Soo Cheong, Ulsan (KR); Ki Soo Park, Ulsan (KR); Seong Min Ha, Ulsan (KR); Chan Ho Song, Ulsan (KR); Jong Gu Kang, Ulsan (KR); Jee Hoon Park, Ulsan (KR)

(73) Assignees: Korea Shipbuilding & Offshore Engineering Co., Ltd., Ulsan (KR); Hyundai Heavy Industries Co., Ltd., Ulsan (KR)

( * ) Notice: Subject to any disclaimer, the term of this patent is extended or adjusted under 35 U.S.C. 154(b) by 682 days.

(21) Appl. No.: 15/577,219

(22) PCT Filed: May 26, 2016

(86) PCT No.: PCT/KR2016/005583
§ 371 (c)(1),
(2) Date: Nov. 27, 2017

(87) PCT Pub. No.: WO2016/190680
PCT Pub. Date: Dec. 1, 2016

(65) Prior Publication Data
US 2018/0141618 A1    May 24, 2018

(30) Foreign Application Priority Data

Jun. 2, 2015  (KR) .......................... 10-2015-0077888
Jun. 5, 2015  (KR) .......................... 10-2015-0080176
(Continued)

(51) Int. Cl.
*G06Q 50/04*  (2012.01)
*B63J 99/00*  (2009.01)
(Continued)

(52) U.S. Cl.
CPC ............... *B63B 71/00* (2020.01); *B63J 99/00* (2013.01); *G06F 3/0661* (2013.01); *G06F 40/12* (2020.01);
(Continued)

(58) Field of Classification Search
CPC ....... B63B 71/00; G06F 40/12; G06F 3/0661; G06F 40/154; G06F 40/14; G06Q 50/04;
(Continued)

(56) References Cited

U.S. PATENT DOCUMENTS

2005/0273768 A1*  12/2005  Doughan .............. G06F 16/986
                                                                    717/136
2007/0005805 A1*  1/2007   Drath ...................... G06F 16/84
                                                                    709/246
(Continued)

FOREIGN PATENT DOCUMENTS

CN     104257048 A     1/2015
JP     2009-169798 A   7/2009
(Continued)

OTHER PUBLICATIONS

Zhuo, G. "Marine Data Collection and Transmission System for ECO-boat" [Master's Thesis] University of Agder, Faculty of Eng. and Science [retrieved on May 24, 2020], Retrieved from <https://uia.brage.unit.no/uia-xmlui/handle/11250/221179> (Year: 2014).*

(Continued)

*Primary Examiner* — Rehana Perveen
*Assistant Examiner* — Alfred H B Wechselberger
(74) *Attorney, Agent, or Firm* — Blank Rome LLP

(57) ABSTRACT

The present invention relates to a ship data consolidated management method and a device for same. Accordingly, the present invention relates to a ship data consolidated management method and device, the method being characterized by comprising the steps of: collecting ship data from
(Continued)

at least one piece of ship equipment; converting the ship data to a certain data format; and transmitting the converted ship data to an external device.

14 Claims, 14 Drawing Sheets

(30) Foreign Application Priority Data

Jun. 5, 2015 (KR) .................. KR10-2015-0080179
May 28, 2016 (KR) ........................ 10-2015-0075324

(51) Int. Cl.

| | |
|---|---|
| G06Q 10/06 | (2012.01) |
| H04Q 9/02 | (2006.01) |
| B63B 71/00 | (2020.01) |
| G06Q 50/10 | (2012.01) |
| G06F 40/12 | (2020.01) |
| G06F 3/06 | (2006.01) |
| H04B 7/185 | (2006.01) |
| H04Q 9/04 | (2006.01) |

(52) U.S. Cl.
CPC .............. *G06Q 10/06* (2013.01); *G06Q 50/04* (2013.01); *G06Q 50/10* (2013.01); *H04B 7/185* (2013.01); *H04Q 9/02* (2013.01); *H04Q 9/04* (2013.01); *H04Q 2209/10* (2013.01)

(58) Field of Classification Search
CPC ......... G06Q 10/06; G06Q 50/10; B63J 99/00; H04B 7/185; H04Q 9/02; H04Q 9/04; H04Q 2209/10

See application file for complete search history.

(56) References Cited

U.S. PATENT DOCUMENTS

| | | | |
|---|---|---|---|
| 2007/0032950 | A1 | 2/2007 | O'Flanagan et al. |
| 2013/0036352 | A1* | 2/2013 | Hui ....................... G06F 40/154 |
| | | | 715/234 |
| 2014/0114696 | A1 | 4/2014 | Amigo et al. |
| 2014/0244692 | A1* | 8/2014 | Williamson ............ G06F 16/83 |
| | | | 707/791 |
| 2014/0277831 | A1 | 9/2014 | Hunt |
| 2015/0025733 | A1 | 1/2015 | Choi |
| 2015/0100879 | A1 | 4/2015 | Nandagopal et al. |
| 2015/0120478 | A1 | 4/2015 | Jang et al. |

FOREIGN PATENT DOCUMENTS

| | | | | |
|---|---|---|---|---|
| KR | 10-2007-0062800 A | 6/2007 | | |
| KR | 100874288 B1 * | 12/2008 | ............. | G06Q 50/04 |
| KR | 10-1321357 B1 | 10/2013 | | |
| KR | 10-2014-0089977 A | 7/2014 | | |
| KR | 10-2014-0117328 A | 10/2014 | | |
| WO | WO 2011/028649 A2 | 3/2011 | | |

OTHER PUBLICATIONS

"C library function—fprintf()" tutorialspoint.com [retrieved on May 25, 2020], Retrieved from <https://web.archive.org/web/20150503053717/https://www.tutorialspoint.com/c_standard_library/c_function_fprintf.htm> (Year: 2015).*

Wikipedia (NMEA 0183), Wikipedia.com [retrieved on May 25, 2020], Retrieved from <https://en.wikipedia.org/w/index.php?title=NMEA_0183&oldid=655929120> (Year: 2015).*

Whitfield et al. "Managing the exchange of engineering product data to support through life ship design" Computer-Aided Design, vol. 43, pp. 516-532 [retrieved on Apr. 13, 2020], Retrieved from <https://www.sciencedirect.com/science/article/pii/S0010448510002241> (Year: 2011).*

Shen et al. "A Development Framework for Ocean Environmental Information Service Application" 2012 Oceans, doi: 10.1109/OCEANS.2012.6405050 [retrieved on Apr. 13, 2020], Retrieved from <http://ieeexplore.ieee.org/stamp/stamp.jsp?tp=&arnumber=6405050> (Year: 2013).*

Li et al. "Research on XML Technology in Data Integration of Maritime" 2012 International Conference on Computer Science and Service System [retrieved on Apr. 12, 2020], Retrieved from <https://ieeexplore.ieee.org/document/6394630> (Year: 2012).*

Rafsanjani et al. "A Top Down Approach to Semi-structured Database Design" 2009 Second International Conference on the Applications of Digital Information and Web Technologies [retrieved on May 25, 2020], Retrieved from <https://ieeexplore.ieee.org/document/5273935> (Year: 2009).*

Broring et al. "Semantically-Enabled Sensor Plug & Play for the Sensor Web" Sensors, vol. 11, pp. 7568-7605; doi: 10.3390/s110807568 [retrieved on Apr. 12, 2020], Retrieved from <https://www.mdpi.com/1424-8220/11/8/7568/pdf> (Year: 2011).*

Jaramillo et al. "Efficient Data Management for Hull Condition Assessment" International Journal of CAD/CAM, vol. 6, No. 1, pp. 9-17 [retrieved on Dec. 4, 2020] (Year: 2006).*

Peal et al. "A Standardized Shipboard Data Acquisition System" Oceans 81; DOI: 10.1109/OCEANS.1981.1151639 (Year: 1981).*

\* cited by examiner

SHIP DATA CONSOLIDATED MANAGEMENT METHOD AND DEVICE

FIELD OF THE INVENTION

The present disclosure relates to a method and apparatus for integrated vessel data management.

BACKGROUND OF THE INVENTION

There are about 460 types of vessel equipment according to the type and size, and vessel equipment occupies 55-65% of vessel building costs. In the vessel, IT equipment that generates vessel data occupies 5-10% of vessel building costs according to the ship type, and is expected to increase up to 15% in the future in keeping with the international demand such as an electronic navigation system (e-navigation).

Current vessel IT equipment individually has dedicated sensors, cables and design methods, requiring so much installation cost and making it difficult to efficiently manage information collected from each vessel equipment.

Conventionally, only a management method for vessel condition monitoring using each vessel IT equipment has been developed, and a method for integratedly managing vessel data collected using each vessel IT equipment and efficiently providing the vessel data to an external system is now needed.

Furthermore, current vessel data collection apparatuses individually output various vessel data in a non-standardized format, failing to integratedly manage vessel data collected using each vessel data collection apparatus and efficiently provide the vessel data to an external system.

Technical Problem

The present disclosure is designed to solve the problem, and therefore the present disclosure is directed to providing a method and apparatus for integrated vessel data management using a standardized vessel data integration platform to comprehensively manage (collect, store, provide) vessel data collected inside the vessel.

The present disclosure is further directed to provide a method and apparatus for vessel data collection using agent which standardizes vessel data and provides the vessel data to an integrated vessel data management apparatus.

The present disclosure is further directed to providing a method for integrated vessel data management that converts vessel data collected inside the vessel to a standardized data format and transmits the vessel data to a shore-based management system or an on-board service device.

The present disclosure is further directed to providing a method and apparatus for integrated vessel data management that provides a vessel data model as a common data model for vessel data collected inside the vessel, and integratedly manages the vessel data using the vessel data model.

SUMMARY OF THE INVENTION

To achieve the object, an integrated vessel data management method according to an embodiment of the present disclosure includes collecting vessel data from at least one vessel IT equipment, converting the vessel data to a particular data format, and transmitting the converted vessel data to an external device.

In the integrated vessel data management method according to an embodiment of the present disclosure, the particular data format may be Javascript Object Notation (JSON) format.

In the integrated vessel data management method according to an embodiment of the present disclosure, the converting to the particular data format may include extracting Key and Value by parsing the collected vessel data, and mapping the extracted Key and Value to the JSON format.

In the integrated vessel data management method according to an embodiment of the present disclosure, the mapping may include receiving input of setting information for the mapping through a mapping tool, mapping the extracted Key and Value to the JSON format based on the setting information, and outputting the mapping results in real time through the mapping tool.

In the integrated vessel data management method according to an embodiment of the present disclosure, the collected vessel data may be in National Marine Electronics Association (NMEA) format.

Furthermore, an integrated vessel data management apparatus according to an embodiment of the present disclosure includes a communication unit configured to transmit and receive data to and from external devices, and a control unit configured to take control to collect vessel data from at least one vessel equipment, convert the vessel data to a particular data format, and transmit the converted vessel data to an external system.

In the integrated vessel data management apparatus according to an embodiment of the present disclosure, the particular data format may be Javascript Object Notation (JSON) format.

In the integrated vessel data management apparatus according to an embodiment of the present disclosure, the control unit may include adapter to extract Key and Value by parsing the collected vessel data and map the extracted Key and Value to the JSON format.

In the integrated vessel data management apparatus according to an embodiment of the present disclosure, the control unit may take control to receive input of setting information for the mapping through a mapping tool, map the extracted Key and Value to the JSON format based on the setting information, and output the mapping results in real time through the mapping tool.

In the integrated vessel data management apparatus according to an embodiment of the present disclosure, the collected vessel data may be National Marine Electronics Association (NMEA) format.

Furthermore, a vessel data collection apparatus according to an embodiment of the present disclosure includes a sensor unit configured to collect raw data including information associated with vessel, a control unit equipped with agent configured to convert the raw data to vessel data in a particular data format, and a communication unit configured to transmit the converted vessel data to another device under the control by the control unit.

In the vessel data collection apparatus according to an embodiment of the present disclosure, the agent may convert the raw data to vessel data in Javascript Object Notation (JSON) format.

In the vessel data collection apparatus according to an embodiment of the present disclosure, the agent may extract Key and Value by parsing the raw data, and map the extracted Key and Value to the JSON format.

In the vessel data collection apparatus according to an embodiment of the present disclosure, the agent may map the extracted Key and Value to the JSON format according to a preset mapping rule. The preset mapping rule may be defined by mapping configuration XML.

In the vessel data collection apparatus according to an embodiment of the present disclosure, the control unit may control the communication unit to transmit the converted vessel data using a queue based transmission protocol.

In the vessel data collection apparatus according to an embodiment of the present disclosure, another device may be an integrated vessel data management apparatus.

Furthermore, a vessel data collection method according to an embodiment of the present disclosure includes collecting raw data including information associated with vessel using at least one sensor, converting the raw data to vessel data in a particular data format, and transmitting the converted vessel data to another device.

In the vessel data collection method according to an embodiment of the present disclosure, the particular data format may be Javascript Object Notation (JSON) format.

In the vessel data collection method according to an embodiment of the present disclosure, the converting may include extracting Key and Value by parsing the raw data, and mapping the extracted Key and Value to the JSON format.

In the vessel data collection method according to an embodiment of the present disclosure, the mapping may include mapping the extracted Key and Value to the JSON format according to a preset mapping rule defined by mapping configuration XML.

In the vessel data collection method according to an embodiment of the present disclosure, the converted vessel data may be transmitted using a queue based transmission protocol.

In the vessel data collection method according to an embodiment of the present disclosure, another device may be an integrated vessel data management apparatus.

Furthermore, an integrated vessel data management method according to another embodiment of the present disclosure includes obtaining at least one API for transmitting and receiving vessel data, converting vessel data received from at least one vessel equipment to a particular data format, and providing at least a part of the converted vessel data requested by an external device to the external device using the at least one API.

In the integrated vessel data management method according to another embodiment of the present disclosure, the external device may be one of a shore-based management system and a third party service device.

In the integrated vessel data management method according to another embodiment of the present disclosure, the method may further include managing at least one API for the third party service through API gateway.

In the integrated vessel data management method according to another embodiment of the present disclosure, the providing to the external device may include filtering the converted vessel data according to a preset filtering rule, and transmitting the filtered vessel data to the shore-based management system in real time.

In the integrated vessel data management method according to another embodiment of the present disclosure, the providing to the external device may include generating push API implementation based on the at least a part requested by the external device, and transmitting the push API implementation to the third party service device.

In the integrated vessel data management method according to another embodiment of the present disclosure, the providing to the external device may include receiving a query request for the at least a part from the third party service, and providing the at least a part corresponding to the query request to the third party service using API's Java API for RESTful Web Service (JAX-RS) API implementation corresponding to the third party service.

In the integrated vessel data management method according to another embodiment of the present disclosure, the at least one API may include API for transmitting the converted vessel data to the external device, and API for allowing the external device to query the converted vessel data.

In the integrated vessel data management method according to another embodiment of the present disclosure, the at least one API may be implemented including at least one of command, vessel identification information, vessel equipment identification information, and IP information.

In the integrated vessel data management method according to another embodiment of the present disclosure, the vessel identification information may be IMO number.

Furthermore, an integrated vessel data management method according to still another embodiment of the present disclosure includes collecting vessel data from at least one vessel equipment, generating vessel data in a standardized data format from the collected vessel data by applying a predefined vessel data model, and providing the vessel data in the standardized data format to an external device.

In the integrated vessel data management method according to still another embodiment of the present disclosure, the vessel data model may be defined by a vessel data model setting file.

In the integrated vessel data management method according to still another embodiment of the present disclosure, the vessel data model setting file may be written in XML.

In the integrated vessel data management method according to still another embodiment of the present disclosure, the vessel data model setting file may include a vessel part describing the structure of the at least one vessel equipment, a system part defining a system that collects the vessel data from the at least one vessel equipment, and a data type part describing the structure and attribute of the vessel data.

In the integrated vessel data management method according to still another embodiment of the present disclosure, the generating of the vessel data in the standardized data format may include extracting identification information and attribute information corresponding to the collected vessel data from the vessel data model setting file, verifying the validity of the collected vessel data using the attribute information, and mapping the collected vessel data to the standardized data format using the identification information.

Furthermore, an integrated vessel data management apparatus according to another embodiment of the present disclosure includes a communication unit configured to receive vessel data from at least one vessel equipment, and a control unit configured to take control to convert the received vessel data to a particular data format and provide at least a part of the converted vessel data requested by a third party service to the third party service.

In the integrated vessel data management apparatus according to another embodiment of the present disclosure, the vessel data model may be defined by a vessel data model setting file.

In the integrated vessel data management apparatus according to another embodiment of the present disclosure, the vessel data model setting file may be written in XML.

In the integrated vessel data management apparatus according to another embodiment of the present disclosure, the vessel data model setting file may include a vessel part describing the structure of the at least one vessel equipment, a system part defining a system that collects the vessel data from the at least one vessel equipment, and a data type part describing the structure and attribute of the vessel data.

In the integrated vessel data management apparatus according to another embodiment of the present disclosure, the control unit may extract identification information and attribute information corresponding to the collected vessel data from the vessel data model setting file, verify the validity of the collected vessel data using the attribute information, and map the collected vessel data to the standardized data format using the identification information.

Advantages of the Invention

The method and apparatus for integrated vessel data management according to an embodiment of the present disclosure standardizes and integratedly manages vessel data collected from various vessel IT equipment, so that the vessel data can be provided to a shore-based management system or a third party service inside/outside the vessel.

Furthermore, the method and apparatus for integrated vessel data management according to an embodiment of the present disclosure provides a standardized platform for vessel data to allow ship-owners and ship companies to conveniently use the vessel data.

The method and apparatus for vessel data collection according to an embodiment of the present disclosure standardizes and outputs vessel data collected from various vessel data collection apparatuses, so that the vessel data can be integratedly managed and provided to a shore-based management system or a third party service inside/outside the vessel.

Furthermore, the method and apparatus for vessel data collection according to an embodiment of the present disclosure provides a standardized platform for vessel data to allow ship-owners and ship companies to conveniently use the vessel data.

The method for integrated vessel data management according to an embodiment of the present disclosure provides vessel data to a shore-based management system in real time, or provides vessel data as push data to a third party service.

The vessel data model according to an embodiment of the present disclosure provides the standard for collection of various vessel data and delivery to a third party service.

Furthermore, the method and apparatus for integrated vessel data management according to an embodiment of the present disclosure easily expands a vessel data model only by changing the vessel equipment level when a new sensor or new vessel equipment is added to the vessel.

DETAILED DESCRIPTION OF THE PREFERRED EMBODIMENTS

Figure 1:
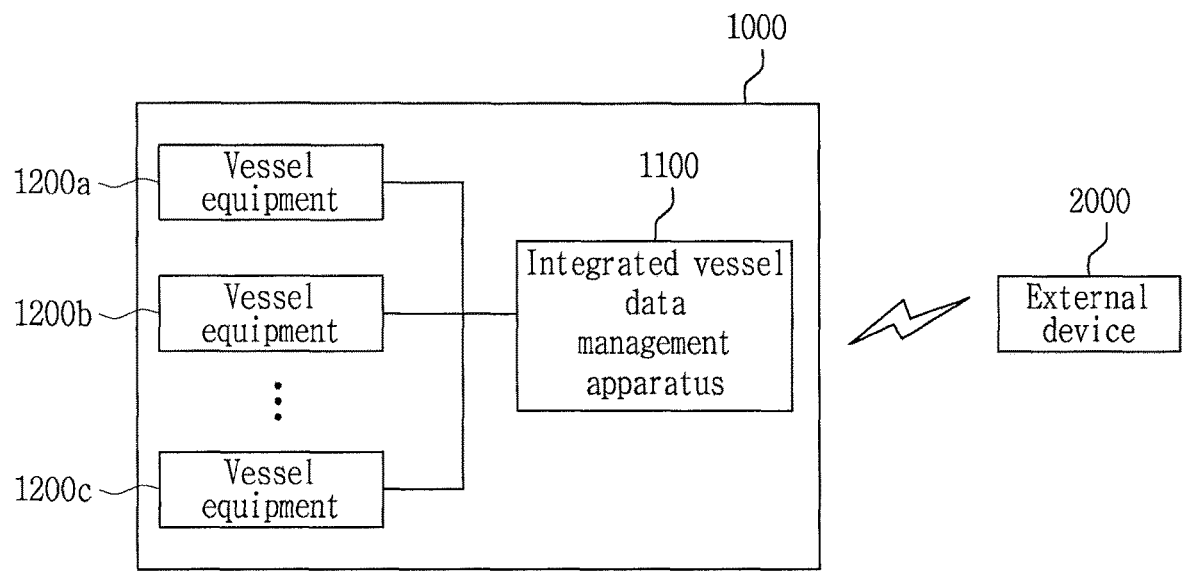
FIG. 1 is a diagram showing the structure of a system in which an integrated vessel data management apparatus according to an embodiment of the present disclosure operates.

In describing the embodiments of the specification, when certain details of related well-known configuration or function are determined to render the subject matter of the present disclosure vague, its detailed description may be omitted herein.

The term "comprises" and "comprising" as used herein specify the presence of stated functions, operations and elements, but do not preclude the presence or addition of one or more other functions, operations and elements. Furthermore, it should be understood that the term "comprises" and "includes" when used in this specification specify the presence of stated features, figures, steps, operation, elements, components or groups thereof, but do not preclude the presence or addition of one or more other features, figures, steps, operation, elements, components or groups thereof. As used herein, the singular forms are intended to include the plural forms as well, unless the context clearly indicates otherwise.

Definition of the key terms as used herein is as below.

Vessel data integration platform (VDIP) refers to a structure for collecting, processing, analyzing, storing and transmitting various vessel data. The vessel data integration platform may refer to any system composed of software and hardware devices that integratedly manage vessel data, or may be used in a software sense of an integrated vessel data management apparatus. In various embodiments, the vessel data integration platform may be used as equivalent meaning to an integrated vessel data management apparatus.

Vessel data model (VDM) is a data model for standardizing and defining all data associated with vessel, and objectizes all devices from vessel itself to an end sensor and defines a relationship between objects and attribute of the objects.

Vessel data model configuration description Language (VCL) is language used to write a vessel data model configuration description file for describing VDM.

Vessel data model configuration file is a configuration file describing VDM in VCL.

Mapping configuration description file is a file that defines a rule for converting equipment output data to VDM based standard data.

Mapping is a process for connecting equipment output data to VDM.

Vessel equipment is equipment mounted on the vessel for a special purpose, and collects various vessel data generated in the vessel, and transmits the collected vessel data to VDIP. The vessel equipment may be classified into Type 1 vessel equipment where agent is mounted and Type 2 vessel equipment where agent is not mounted.

Type 1 vessel equipment is where agent is directly mounted, and extracts Key and Value by analyzing collected vessel data in various formats, converts the extracted Key/Value to VDM based standardized data format (VDM Path/Value) through the agent, and transmits the vessel data converted to the standardized data format to VDIP.

Type 2 vessel equipment converts vessel data collected in various formats to a known marine standard protocol, for example, National Marine Electronics Association (NMEA) format, and transmits the vessel data to VDIP in UDP or file format.

Agent converts vessel data in Key/Value format outputted from Type 1 vessel equipment to a VDM based standardized data format (VDM Path/Value) and transmits the vessel data to VDIP.

Adapter extracts Key and Value by analyzing vessel data received from Type 2 vessel equipment, and converts the extracted Key and Value (Key/Value) to a VDM based standardized data format (VDM Path/Value) through a mapping operation.

Raw data is data in various formats collected by vessel equipment from a sensor or other equipment in the vessel.

Equipment output data is data in a particular format that is transmitted from vessel equipment to agent or adapter, data outputted from Type 1 vessel equipment is in a Key/Value format, and data outputted from Type 2 vessel equipment may be in a known marine standard protocol (for example, NMEA) format.

The "standardized" or "normalized" data is data obtained by converting vessel data in various formats created according to different rules collected from Type 1 vessel equipment or Type 2 vessel equipment to a VDM based particular data format. For example, the agent or adapter extracts Key/Value from raw data and converts to a particular data format based on VDM (VDM Path/Value) through a mapping operation to generate standardized data, and the data format standardized through the agent or adapter may be defined as a JSON format.

Hereinafter, the present disclosure is described with reference to the accompanying drawings.

FIG. 1 is a diagram showing the architecture of a system in which an integrated vessel data management apparatus according to an embodiment of the present disclosure operates.

Referring to FIG. 1, a vessel 1000 according to an embodiment of the present disclosure may include an integrated vessel data management apparatus 1100 and at least one vessel equipment 1200a, 1200b, 1200c.

The at least one vessel equipment 1200a, 1200b, 1200c is various types of equipment mounted on the vessel in an aim of collecting vessel data, and may include all equipment capable of transmitting information collected using at least one sensor to the integrated vessel data management apparatus 1100. The vessel data may include various types such as text, audio and image.

The at least one vessel equipment 1200a, 1200b, 1200c collects raw data using the sensor and transmits it to the integrated vessel data management apparatus 1100. The raw data refers to data in various formats collected by the at least one vessel equipment 1200a, 1200b, 1200c from the sensor. In an embodiment, the at least one vessel equipment 1200a, 1200b, 1200c may include agent that takes control to directly convert the collected raw data to a standardized data format and transmit it to the integrated vessel data management apparatus 1100.

Alternatively, in an embodiment, the at least one vessel equipment 1200a, 1200b, 1200c may transmit raw data to a proxy server having a proxy agent, and in this case, the proxy server may convert raw data to a standardized data format through the proxy agent and transmit it to the integrated vessel data management apparatus 1100. The integrated vessel data management apparatus 110 may manage the at least one vessel equipment 1200a, 1200b, 1200c or the agent provided in the proxy server.

In an embodiment, the at least one vessel equipment 1200a, 1200b, 1200c may include an integrated vessel data management apparatus manufacturer's own vessel equipment (Type 1 vessel equipment) or a third party's vessel equipment (Type 2 vessel equipment). Type 1 vessel equipment may include agent that takes control to convert collected raw data to standardized data and transmit it to the integrated vessel data management apparatus 1100.

In an embodiment of the present disclosure, the at least one vessel equipment 1200a, 1200b, 1200c may be Type 2 vessel equipment. Type 2 vessel equipment does not have a separate agent, and raw data collected from Type 2 vessel equipment is transmitted to the proxy server equipped with the proxy agent or the integrated vessel data management apparatus 1100 according to an embodiment of the present disclosure, and is converted to a standardized data format by the proxy server or the integrated vessel data management apparatus 1100.

Type 2 vessel equipment may include a vessel data recorder (VDR). The integrated vessel data management apparatus 1100 may collect vessel data from the at least one vessel equipment 1200a, 1200b, 1200c. The integrated vessel data management apparatus 1100 may not have a separate sensor or directly generate vessel data by using the at least one vessel equipment 1200a, 1200b, 1200c as gateway for collecting vessel data.

The integrated vessel data management apparatus 1100 may store/manage the raw data received from the at least one vessel equipment 1200a, 1200b, 1200c by converting it to a standardized data format. The integrated vessel data management apparatus 1100 may convert the raw data to a standardized data format using a program defining a mapping relationship between the format of the raw data and the standardized data format.

The integrated vessel data management apparatus 1100 may provide a user with a mapping tool for data conversion or mapping between the raw data and the vessel data in the standardized data format. When the at least one vessel equipment 1200a, 1200b, 1200c has agent that converts raw data to a standardized data format, the integrated vessel data management apparatus 1100 may store or manage the vessel data received from the at least one vessel equipment 1200a, 1200b, 1200c without separate conversion.

In an embodiment, the vessel data received from the at least one vessel equipment 1200a, 1200b, 1200c may be in any data format, for example, National Marine Electronics Association (NMEA) format, and the converted standardized data format may be a JavaScript Object Notation (JSON) format. In this case, the integrated vessel data management apparatus 1100 may convert vessel data in NMEA format to a JSON format by mapping.

The integrated vessel data management apparatus 1100 may provide the converted vessel data to at least one external device 2000 (for example, a shore-based management system or a third party service device) through an artificial satellite or standardized API. As the external device 2000, the third party service device may be any device with a third party software (on-board service software) using vessel data.

The integrated vessel data management apparatus 1100 according to an embodiment of the present disclosure may provide and manage API for transmitting and receiving data including the vessel data to and from the external device 2000 or allowing the external device 2000 to query the vessel data in the integrated vessel data management apparatus 1100.

Hereinafter, a further detailed operation of the integrated vessel data management apparatus 1100 is described.

Figure 2:
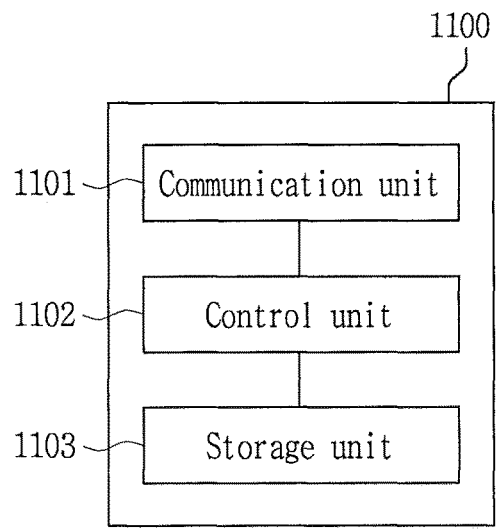
FIG. 2 is a block diagram showing the physical architecture of an integrated vessel data management apparatus according to an embodiment of the present disclosure.

FIG. 2 is a block diagram showing the physical architecture of the integrated vessel data management apparatus according to an embodiment of the present disclosure.

Referring to FIG. 2, the integrated vessel data management apparatus 1100 may include a communication unit 1101, a control unit 1102, and a storage unit 1103.

The communication unit 1101 may transmit and receive data to and from external devices. In various embodiments, the communication unit 111 may receive vessel data from the at least one vessel equipment 1200a, 1200b, 1200c, or may transmit vessel data to another device 2000.

The control unit 1102 controls the components of the integrated vessel data management apparatus 1100 to perform integrated vessel data management according to the embodiment of the present disclosure. When vessel data is received from the at least one vessel equipment 1200a, 1200b, 1200c through the communication unit 1101, the control unit 1102 converts it to a standardized data format. The control unit 1102 may control the communication unit 1101 to store the converted vessel data in the storage unit 1103 or transmit the converted vessel data to another device 2000. A further detailed operation of the control unit 1102 is described below.

The storage unit 1103 may store the vessel data under the control by the control unit 1102. In various embodiments, the storage unit 1103 may store the vessel data for a preset period (for example, 30 days), and after the preset period passes, may delete the stored vessel data to manage the storage space.

Figure 3:
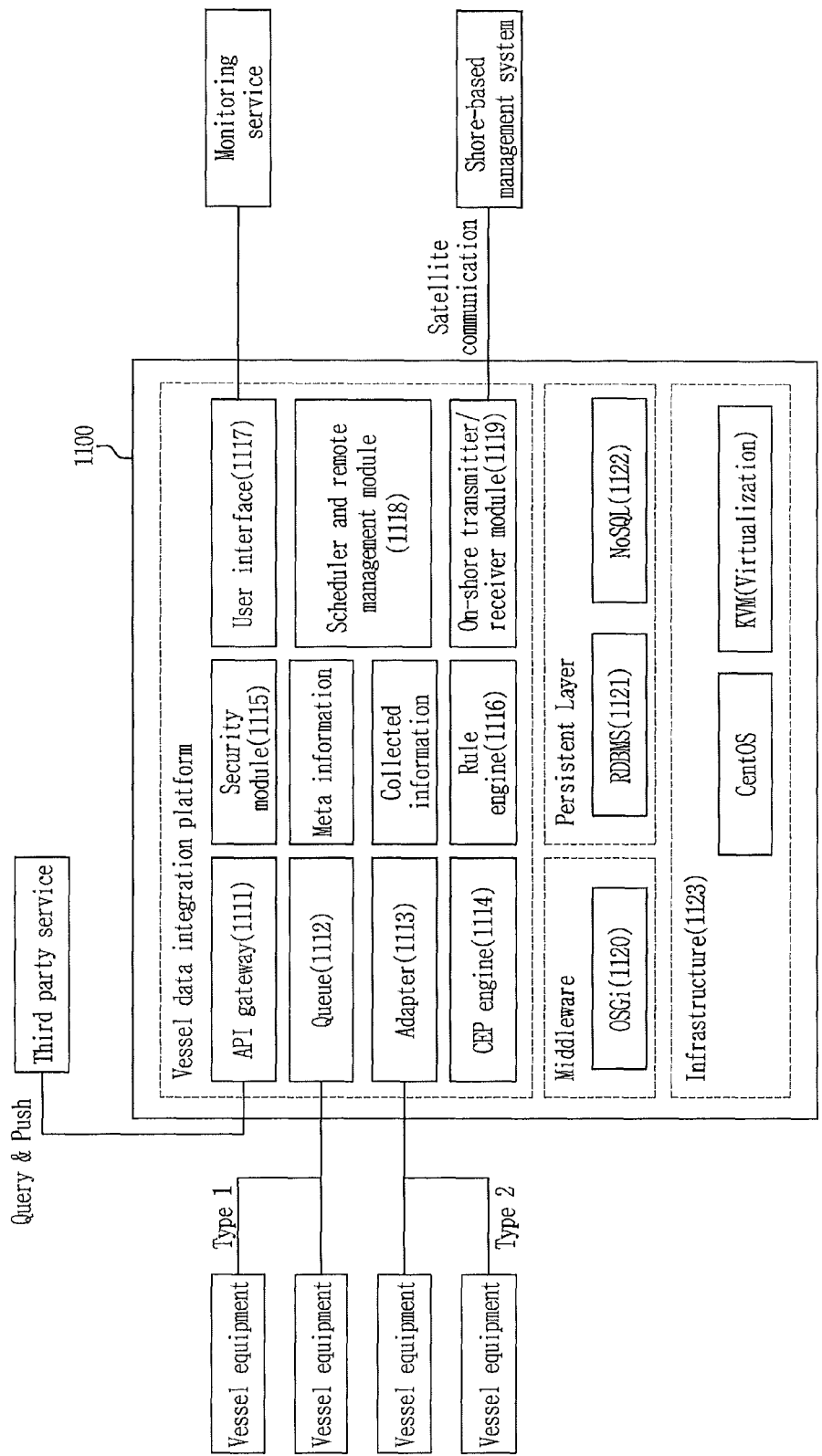
FIG. 3 is a block diagram showing the logical architecture of an integrated vessel data management apparatus according to an embodiment of the present disclosure.

FIG. 3 is a block diagram showing the logical architecture of the integrated vessel data management apparatus according to an embodiment of the present disclosure.

API gateway 1111 performs the operation such as management (publishing, etc.), authentication, authorization control, and standard document generation of API. The API gateway 1111 may perform the operation of providing vessel data in a standardized data format to a third party service.

Queue 1112 performs queue based transmission and reception control to receive data from vessel equipment and process the data in real time. Adapter 1113 plays a role in converting vessel data received from Type 2 vessel equipment to a standardized (normalized) data format. In an embodiment, when vessel data received from the at least one vessel equipment 1200a, 1200b, 1200c is in National Marine Electronics Association (NMEA) format, the adapter 1113 may extract Key/Value (KV) by parsing NMEA. Furthermore, in an embodiment, when the standardized data format is a Javascript Object Notation (JSON) format, the adapter may map the extracted Key/Value (KV) to the JSON format according to any mapping rule.

Complex event processing (CEP) engine 1114 performs real-time analysis of vessel data. The CEP engine 1114 stores a filtering rule of vessel data, and through this, performs data filtering and data integration. When it is determined that there is vessel data to be immediately transmitted to a shore-based management system by filtering, the CEP engine 1114 transmits the corresponding vessel data to the shore-based management system via satellite communication. Furthermore, when it is determined that there is vessel data to be transmitted to a third party service by filtering, the CEP engine 1114 transmits the corresponding vessel data to topic listener of an open service gateway interface (OSGI) 1120 through the queue 1112.

Security module 1115 establishes a security relationship between a third party service and the integrated vessel data management apparatus, or supports the encryption for data communication with a shore-based management system.

Rule engine 1116 manages a data validation rule about a method whereby the topic listener processes data. For example, the data validation rule may require that all data of 'group1' data set be stored in MongoDB group1 Collection.

User interface 1117 provides an input/output interface to enable a monitoring service in the vessel to output vessel data related information and receive user input.

Scheduler and remote management module 1118 controls the scheduling and remote management of the integrated vessel data management apparatus 1100.

On-shore transmitter/receiver module 1119 controls the transmission and reception of data between the integrated vessel data management apparatus 1100 and the shore-based management system.

Open service gateway interface (OSGI) 1120 includes at least one topic listener. The topic listener verifies vessel data through a rule and stores the vessel data. When there is vessel data (push data) to push to a third party service, the topic listener transmits the corresponding vessel data to API gateway 1111 using PUSH API implementation.

Relational data base management system (RDBMS) 1121 manages meta information for at least one third party service. The meta information may include identification information and authentication information of the third party service.

NoSQL 1122 may perform the operation of storing various types of collected data. The NoSQL 1122 may store general vessel data except data to be immediately provided to a shore-based management system among the collected vessel data. The general vessel data stored in the NoSQL 1122 may be periodically processed according to a processing logic (Near Real, Batch) and transmitted to the shore-based management system.

Infrastructure 1123 plays a role in providing an OS and virtual environment.

Hereinafter, based on the logical architecture of the integrated vessel data management apparatus 1100, a detailed method for collecting/converting/providing vessel data by the integrated vessel data management apparatus 1100 is described.

Figure 4:
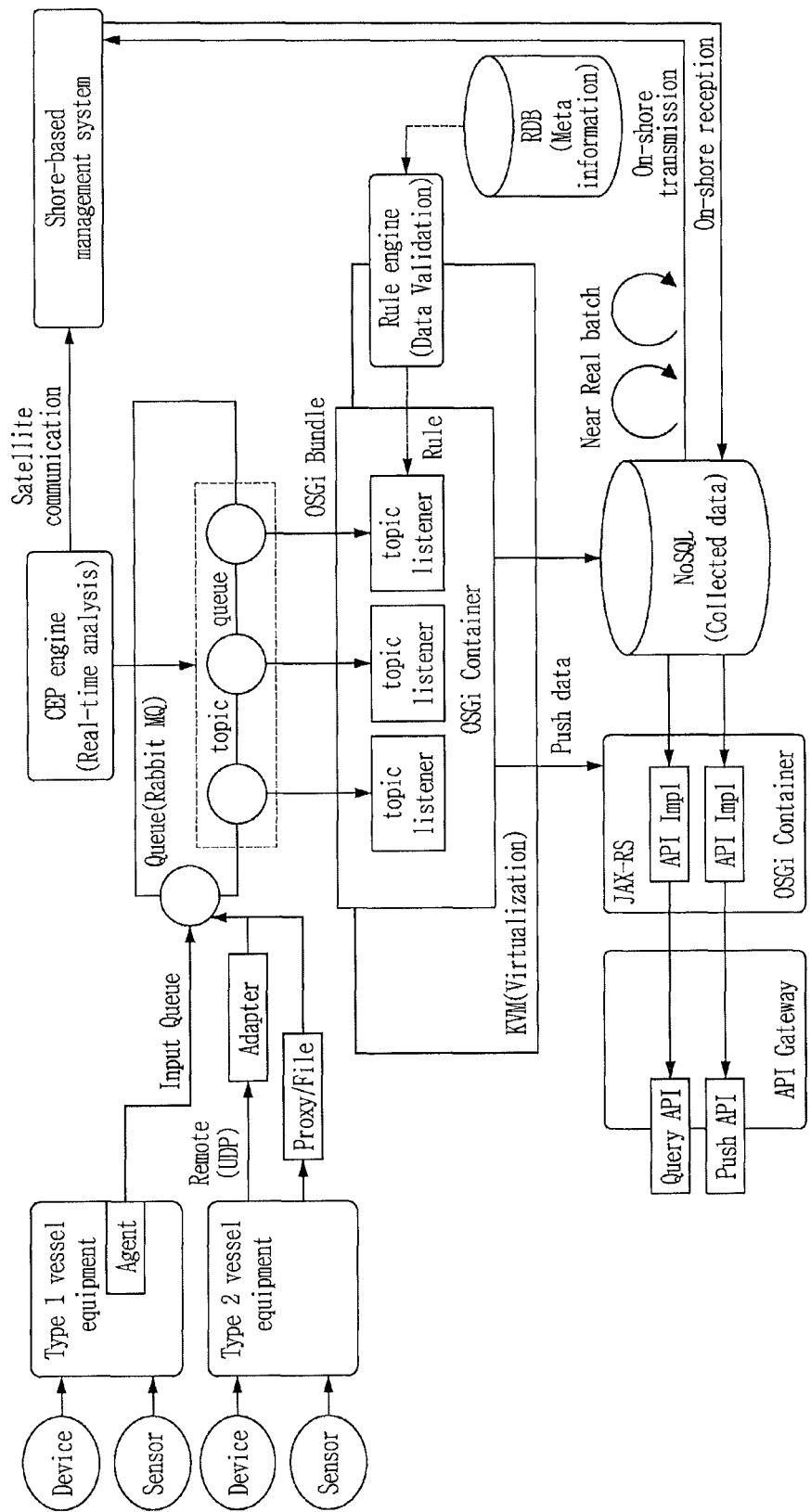
FIG. 4 is a flowchart showing an integrated vessel data management method according to an embodiment of the present disclosure based on the logical architecture.

FIG. 4 is a flowchart showing the integrated vessel data management method according to an embodiment of the present disclosure based on the logical architecture. The integrated vessel data management method shown in FIG. 4 may be classified into a vessel data collection method, a vessel data conversion method, and a vessel data providing method.

Vessel Data Collection

In various embodiments of the present disclosure, the integrated vessel data management apparatus 1100 collects vessel data from at least one vessel equipment 1200*a*, 1200*b*, 1200*c*. The at least one vessel equipment 1200*a*, 1200*b*, 1200*c* may output raw data in a data format (for example, NMEA 0183) applied to the vessel equipment. The at least one vessel equipment 1200*a*, 1200*b*, 1200*c* may have agent that converts the raw data to a standardized data format (for example, Key/Value, XML, JSON), and in this case, the at least one vessel equipment 1200*a*, 1200*b*, 1200*c* may output data in a standardized data format. Hereinafter, vessel equipment that outputs data in a standardized data format is referred to as Type 1 vessel equipment, and vessel equipment that outputs non-standardized raw data is referred to as Type 2 vessel equipment.

The integrated vessel data management apparatus 1100 collects vessel data in a standardized data format from Type 1 vessel equipment by transmitting it to queue using a queue based transmit protocol. In various embodiments of the present disclosure, the standardized data format may be a JSON (Javascript Object Notation) format. The integrated vessel data management apparatus 1100 may collect raw data in UDP or file format from Type 2 vessel equipment and convert it to a standardized data format.

Vessel Data Conversion

In various embodiments of the present disclosure, the integrated vessel data management apparatus 1100 converts raw data in UDP or file format collected from Type 2 vessel equipment to a standardized data format. The integrated vessel data management apparatus 1100 controls the adapter 1113 to convert vessel data collected from Type 2 vessel equipment to a standardized data format. A defiled logical architecture of the adapter 1113 for converting vessel data is as shown in FIG. 5.

Figure 5:
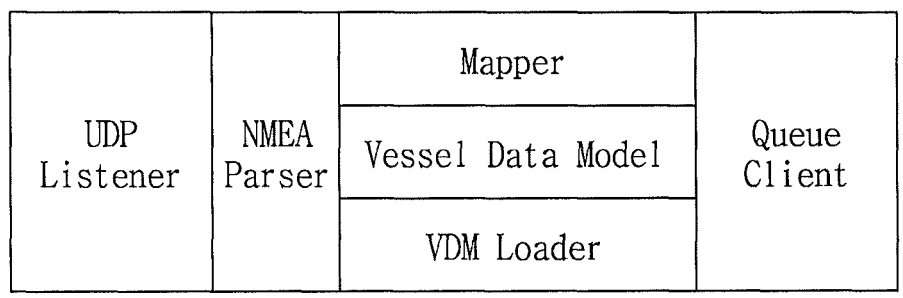
FIG. 5 is a diagram showing the detailed logical architecture of adapter according to an embodiment of the present disclosure.

Referring to FIG. 5, the integrated vessel data management apparatus 1100 receives vessel data from Type 2 vessel equipment through UDP listener. In an embodiment, the vessel data received from Type 2 vessel equipment may be in NMEA (specifically, NMEA 0183) format. The integrated vessel data management apparatus 1100 may extract Key/Value (KV) from the vessel data in NMEA format through NMEA parser.

The integrated vessel data management apparatus 1100 may map the extracted Key/Value (KV) to VDM, i.e., a standardized data format, through a mapper. The mapper may include at least one mapping rule that defines a mapping relationship between the data format of the vessel data received from Type 2 vessel equipment and the standardized data format. The mapping rule may be set (defined) by mapping configuration XML, and the mapping configuration XML may be updated remotely from a shore-based management system.

In an embodiment, the standardized data format may be a JSON format. In this case, the integrated vessel data management apparatus 1100 may map the extracted Key/Value (KV) to a JSON format, like the embodiment shown in Table 1.

In Table 1, "KV input" part exemplifies raw data in Key/Value format, and "JSON output" part exemplifies a standardized data format (VDM Path/Value) converted to a JSON format.

The integrated vessel data management apparatus 1100 may extract Key from the raw data in Key/Value format (for example, sensor1="23", here, Key is "sensor1" and Value is "23"), and may be allocated with VDM Path corresponding to the extracted Key based on VDM, so that it is expressed in a standardized data format, i.e., a JSON format (VDM Path/Value) (e.g., "Equipment/ . . . ", key: "sensor1", value: 23).

TABLE 1

| KV input |
| --- |
| sensor1 = "23"<br>sensor2 = "55"<br>JSON output<br>{ vdmpath: "Equipment/...",<br>key: "sensor1",<br>value: 23,<br>dataset: "group1" },<br>{ vdmpath: "Equipment/...",<br>key: "sensor2",<br>value: 55} |

In various embodiments of the present disclosure, the integrated vessel data management apparatus 1100 may provide a user with a mapping tool for mapping of the vessel data. Through the mapping tool, the integrated vessel data management apparatus 1100 may receive input of setting information for vessel data mapping from the user, perform vessel data mapping as per the user input, and output the mapping results in real time.

Figure 6:
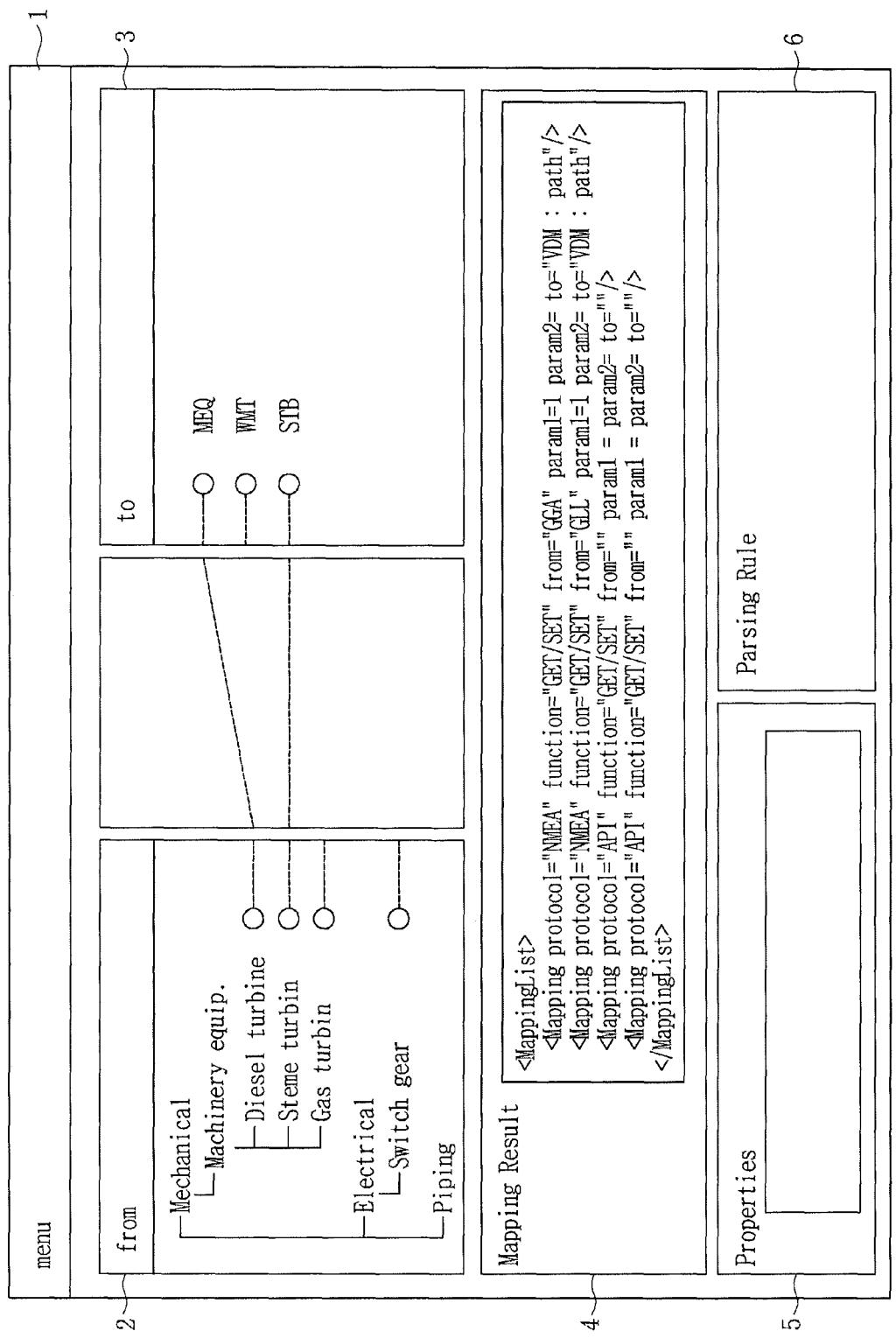
FIG. 6 is a diagram showing an example of a mapping tool according to an embodiment of the present disclosure.

FIG. 6 is a diagram showing an example of the mapping tool according to an embodiment of the present disclosure. The mapping tool may be configured including a user interface that defines Key and Value format of vessel data received from vessel equipment, defines a standardized data format, commands to perform mapping, and stores a mapping rule in the form of library.

In FIG. 6, a menu window 1 is a panel displaying various types of menus for mapping tool manipulation.

A left window 2 is a window displaying hierarchically load data (sensor data) collected from a sensor of vessel equipment, and is designed in consideration of user access easiness and intuition. In setting information of sensor data, the mapping tool may provide means to embody vessel data model provided in a generalized format, and may be designed to select and load the latest set vessel data model, contributing to the user convenience, and load a standard value from the vessel data model to present guidelines for an appropriate value.

A right window 3 is a window displaying vessel data information of vessel equipment, and may display a list of vessel data information of vessel equipment corresponding to sensor data of the left window 2. A mapping result display window 4 outputs the mapped results in real time. The mapping results may be transmitted to the adapter 1113, and the mapping tool may generate an event notifying that the mapping results have been generated. In vessel data mapping, the mapping tool may provide a function to select a suitable mapping method for the characteristics of the corresponding the vessel 1000 and a function to configure an optimal GUI for a mapping source.

A property window 5 is a window displaying information of a selected element and a parsing rule window 6 is a window for inputting settings for parsing.

Through the adapter 1113 or proxy file agent, the integrated vessel data management apparatus 1100 may convert vessel data to a standardized data format and input it to the queue 1112. The vessel data inputted to the queue 1112 may be grouped as shown in FIG. 4. The grouping may be performed for each of all types of vessel data, sensors, engines, services, and component vessel equipment, like the embodiment shown in Table 2.

TABLE 2

| All vessel data collected from vessel equipment equipment.* |
| All vessel data of No. 1 Engine engine.1.* |
| Vessel data of Dataset group1 dataset.group1.* |

For conversion of the vessel data, vessel data model (VDM) may be applied to the integrated vessel data management apparatus 1100. The integrated vessel data management apparatus 1100 may load the VDM applied to the integrated vessel data management apparatus 1100 through VDM loader.

As described above, the vessel data model is a data model for standardizing and defining all data associated with the vessel, and objectizes all devices ranging from the vessel itself to the end sensor and defines a relationship between objects and attribute of the objects. In an embodiment of the present disclosure, the vessel data model is applied to define a rule for storing each vessel data with a systematic classification system to allow easy access from the external, by defining a document in which the structure of the vessel is intuitively organized and applying it to the vessel data. The vessel data model may have the meaning identical or similar to vessel data in a standardized data format.

XSD based schema for flexibly and scalably defining the vessel data model, or Vessel Configuration Description Language (VCL), may be applied to the vessel data model of the present disclosure. That is, an embodiment of the present disclosure enables the adapter 1113 to standardize vessel data using VCL, thereby easily expanding the vessel data model in case that a new sensor or new vessel equipment is added to the vessel 1000.

Furthermore, metadata for defining information of each real vessel 1000 based on the vessel data model, or VDM Configuration XML, may be applied to the vessel data model of the present disclosure. The integrated vessel data management apparatus 1100 may remotely update VDM Configuration XML by receiving change information of VDM Configuration XML from a shore-based management system.

Furthermore, a path designating rule for pointing to particular vessel data on the vessel data model on the similar concept to XML's Xpath, or Vessel Data Model Path (VDM Path), may be applied to the vessel data model of the present disclosure. The VDM Path may be allocated to each vessel sensor by VDM Configuration XML. The integrated vessel data management apparatus 1100 may identify each vessel data according to the VDM Path in transmitting and receiving vessel data based on VDM.

Vessel Data Providing

In various embodiments of the present disclosure, the integrated vessel data management apparatus 1100 may provide vessel data inputted to the queue 1112 to another device, for example, a shore-based management system or a third party service device. Another device may use the received vessel data for an economical sailing system (ENI-RAM) and an additional service (collision avoidance, engine monitoring, etc.).

Using the CEP engine 1114, the integrated vessel data management apparatus 1100 may filter vessel data to be provided to a shore-based management system in real time from the collected vessel data, and immediately transmit the filtered vessel data to the shore-based management system via satellite communication. A filtering rule for filtering vessel data in real time (real-time satellite transmission rule) may be preset in the CEP engine 1114. For example, when dataset of which the filtering rule is generated within 10 seconds is group1 vessel data, the filtering rule may be preset as shown in Table 3.

TABLE 3

| from inputQueue[dataset = 'group1'] within 10000 |
| select key, value |
| insert into satelliteStream |

The integrated vessel data management apparatus 1100 may transmit and receive vessel data in a standardized data format between the integrated vessel data management apparatus 1100 and a shore-based management system, or a JSON format.

Vessel data that is not transmitted to a shore-based management system in real time among the collected vessel data may be stored in the NoSQL 1122, and transmitted to a shore-based management system according to a periodic processing logic (Near Real, Batch).

The integrated vessel data management apparatus 1100 may transmit the collected vessel data to the topic listener of the OSGI 1120 using the queue 1112 performing data processing in real time. The topic listener may verify and process the vessel data in JSON format according to the rule stored in the rule engine 1116. The topic listener may process push data in the vessel data and transmit it to the API gateway 1111 using Push API implementation, and the API gateway 1111 may transmit the Push API implementation to a third party service.

Figure 7:
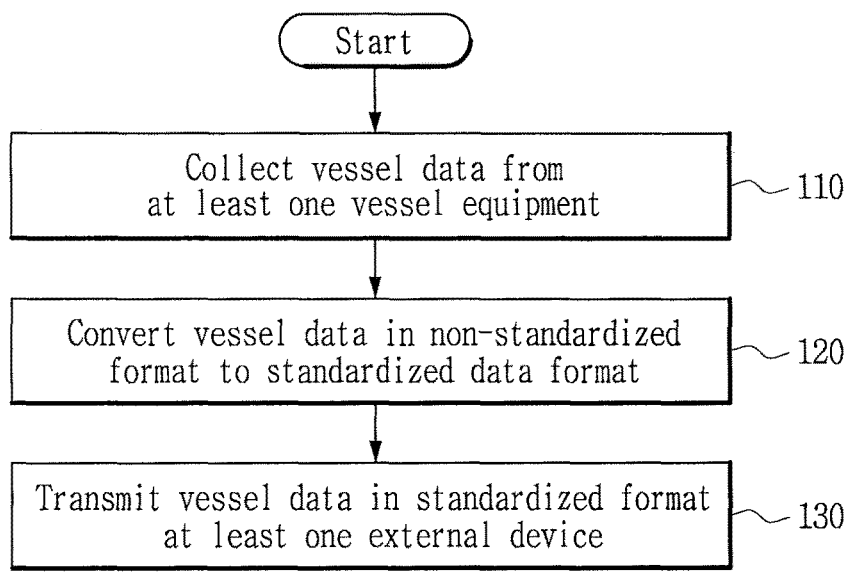
FIG. 7 is a flowchart showing an integrated vessel data management method according to an embodiment of the present disclosure.

FIG. 7 is a flowchart showing the integrated vessel data management method according to an embodiment of the present disclosure.

Referring to FIG. 7, the integrated vessel data management apparatus 1100 according to an embodiment of the present disclosure collects vessel data from at least one vessel equipment 1200a, 1200b, 1200c (110). The collected vessel data may be in a non-standardized format or standardized format.

The integrated vessel data management apparatus 1100 converts vessel data in a non-standardized format among the collected vessel data to a standardized data format (120). In an embodiment, the standardized format may be a JSON format, and in this case, the integrated vessel data management apparatus 1100 may extract Key/Value by parsing the vessel data, and convert to a standardized data format (VDM Path/Value) by mapping the extracted Key/Value to a JSON format.

The integrated vessel data management apparatus 1100 may transmit the vessel data in standardized format to at least one external device (130). The external device may be one of a shore-based management system and a third party service device. The integrated vessel data management apparatus 1100 may filter the vessel data according to a preset filtering rule, and transmit the filtered vessel data to a shore-based management system in real time. Alternatively, the integrated vessel data management apparatus 1100 may generate push API implementation based on a part of the vessel data requested by a third party service, and transmit it to the third party service device.

Figure 8:
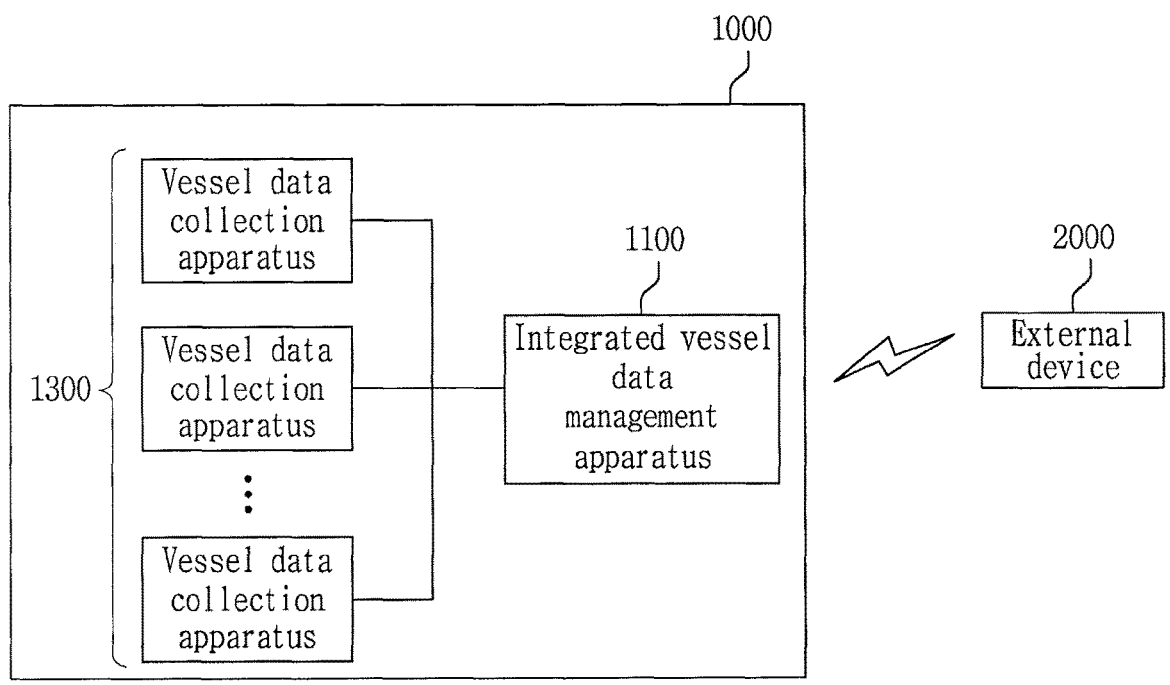
FIG. 8 is a diagram showing the structure of a system in which a vessel data collection apparatus according to an embodiment of the present disclosure operates.

FIG. 8 is a diagram showing the structure of a system in which the vessel data collection apparatus according to an embodiment of the present disclosure operates.

Referring to FIG. 8, a vessel 1000 according to an embodiment of the present disclosure may include at least one vessel data collection apparatus 1300 and an integrated vessel data management apparatus 1100. The vessel data collection apparatus 1300 is various types of equipment mounted on the vessel 1000 in an aim of collecting vessel data, and may include all equipment capable of transmitting information collected using at least one sensor to the integrated vessel data management apparatus 1100. The vessel data collated by the at least one vessel data collection apparatus 1300 may include various types such as text, audio and image.

The at least one vessel data collection apparatus 1300 collects raw data including information associated with the vessel using the sensor. The raw data refers to data in various formats collected by the vessel data collection apparatus 1300 from the sensor. According to the embodiment of the present disclosure, the at least one vessel data collection apparatus 1300 may include agent that takes control to directly convert the collected raw data to a standardized data format and transmit it to the integrated vessel data management apparatus 1100.

The at least one vessel data collection apparatus 1300 may be classified into the integrated vessel data management apparatus 1100 manufacturer's own vessel data collection apparatus (Type 1 vessel data collection apparatus) and a third party's vessel data collection apparatus (Type 2 vessel data collection apparatus). Of them, vessel data collection apparatus equipped with agent that performs vessel data conversion may be Type 1 vessel data collection apparatus, and accordingly, the vessel data collection apparatus that performs the operation according to the embodiment of the present disclosure may be Type 1 vessel data collection apparatus. Type 1 vessel data collection apparatus may include an advanced control and intelligent system (ACONIS), an inertial navigation system (INS), and a loading computer.

The at least one vessel data collection apparatus 1300 may transmit vessel data to the integrated vessel data management apparatus 1100. The at least one vessel data collection apparatus 1300 plays a gateway role for vessel data collection of the integrated vessel data management apparatus 1100, requiring the integrated vessel data management apparatus 1100 not to have a separate sensor or directly generate vessel data.

In an embodiment, the at least one vessel data collection apparatus 1300 may be managed/controlled by the integrated vessel data management apparatus 1100 to perform the operation of collecting vessel data.

The integrated vessel data management apparatus 1100 may store/manage vessel data in a standardized data format received from the at least one vessel data collection apparatus 1300, and provide the vessel data to at least one external device 2000 (for example, a shore-based management system or a third party service device) through an artificial satellite or standardized API.

Hereinafter, a further detailed operation of the at least one vessel data collection apparatus 1300 is described.

Figure 9:
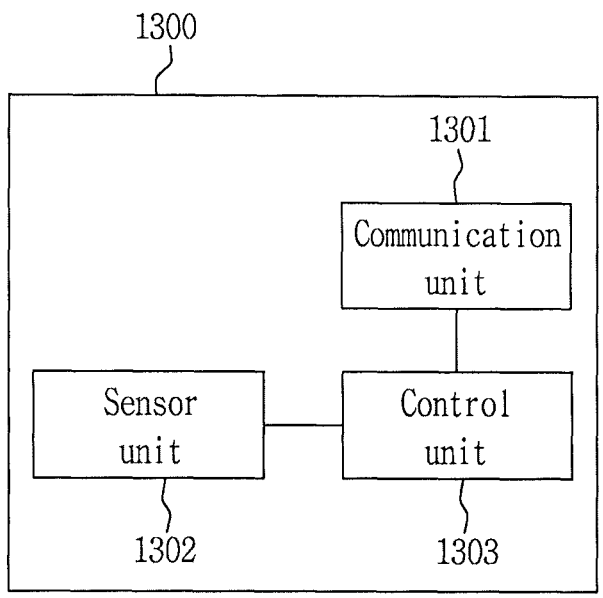
FIG. 9 is a block diagram showing the physical architecture of a vessel data collection apparatus according to an embodiment of the present disclosure.

FIG. 9 is a block diagram showing the physical architecture of the vessel data collection apparatus according to an embodiment of the present disclosure.

Referring to FIG. 9, the vessel data collection apparatus 1300 may include a communication unit 1301, a sensor unit 1302, and a control unit 1303.

The communication unit 1301 may transmit and receive data to and from external devices. In various embodiments, the communication unit 1301 may transmit and receive vessel data to and from the integrated vessel data management apparatus 1100.

The sensor unit 1302 may collect vessel related information using at least one sensor. The sensor unit 3102 may include, for example, a speed/acceleration/velocity sensor, a gyro sensor, a flow detection sensor, a temperature sensor, a pressure sensor, and a level sensor. The vessel related information collected by the sensor unit 1302 may be referred to as raw data. The sensor unit 1302 may transmit the collected raw data to the control unit 1303.

The control unit 1303 controls each component of the vessel data collection apparatus 1300 to collect vessel data according to an embodiment of the present disclosure. The control unit 1303 may collect raw data through the sensor unit 1302, and may control the communication unit 1301 to convert the raw data to a standardized data format and transmit it to the integrated vessel data management apparatus 1100. In various embodiments, the control unit 1303 may perform the operation of collecting vessel data under the management and control by the integrated vessel data management apparatus 1100.

A further detailed operation of the control unit 1303 may include the operation of controlling the physical architecture elements of the vessel data collection apparatus to perform the operation according to the logical architecture.

Figure 10:
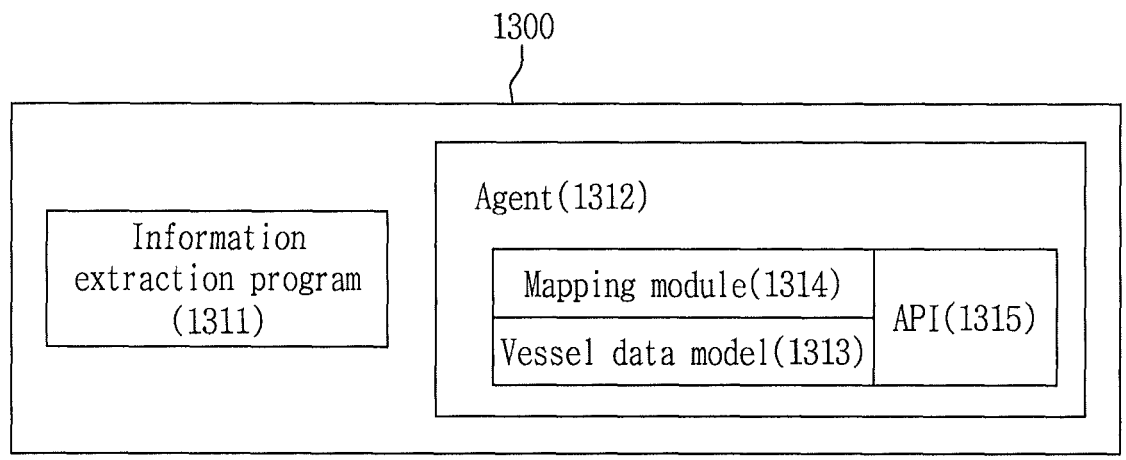
FIG. 10 is a block diagram showing the logical architecture of a vessel data collection apparatus according to an embodiment of the present disclosure.

FIG. 10 is a block diagram showing the logical architecture of the vessel data collection apparatus according to an embodiment of the present disclosure.

An information extraction program module 1311 extracts, from raw data collected through at least one sensor, information necessary to convert the raw data to a standardized data format.

The raw data may have any data format (for example, NMEA 0183) supported by the vessel data collection apparatus 1300. Furthermore, the standardized data format may be, for example, Key/Value, XML, and Javascript Object Notation (JSON) format. When the standardized data format is a JSON format, the information extraction program module 1311 may extract Key/Value (KV) by parsing the raw data.

In various embodiments, the information extraction program module 1311 may be provided in agent 1312.

The agent 1312 converts raw data collected by the vessel data collection apparatus 1300 to a standardized data format, and provides it to the integrated vessel data management apparatus 1100. Accordingly, the agent 1312 enables linking of vessel data with vessel data integration middleware provided in the integrated vessel data management apparatus 1100, exchange of various types of setting files, and stable transmission and reception of vessel data in batch.

In various embodiments, the agent 1312 may be remotely controlled by the integrated vessel data management apparatus 1100.

A vessel data model (VDM) 1313 may be applied to the agent 1312. As described above, the vessel data model 1313 is a data model for standardizing and defining all data associated with the vessel 1000, and objectizes all devices ranging from the vessel 1000 itself to the end sensor and defines a relationship between objects and attribute of the objects. In an embodiment of the present disclosure, the vessel data model is applied to define a rule for storing each vessel data with a systematic classification system to allow easy access from the external, by defining a document in which the structure of the vessel 1000 is intuitively organized and applying it to the vessel data. The vessel data model may have the meaning identical to or including vessel data in a standardized data format.

XSD based schema for flexibly and scalably defining the vessel data model, or Vessel Configuration Description Language (VCL), may be applied to the vessel data model of the present disclosure. That is, the present disclosure enables the agent 1312 to standardize vessel data using VCL, thereby easily expanding the vessel data model even in case that a new sensor or a new vessel data collection apparatus 1300 is added to the vessel 1000.

Furthermore, metadata for defining information of each actual vessel 1000 based on the vessel data model, or VDM Configuration XML, may be applied to the vessel data model of the present disclosure. The vessel data collection apparatus 1300 may remotely update VDM Configuration XML by receiving change information of VDM Configuration XML from a shore-based management system through the integrated vessel data management apparatus 1100.

Furthermore, a path designating rule for pointing to particular vessel data on the vessel data model on the similar concept to XML's Xpath, or Vessel Data Model Path (VDM Path), may be applied to the vessel data model of the present disclosure. The VDM Path may be allocated to each vessel sensor by VDM Configuration XML. The agent 1312 and the integrated vessel data management apparatus 1100 may identify each vessel data according to the VDM Path in transmitting and receiving vessel data based on the VDM.

A mapping module 1314 may convert raw data to a standardized data format using a mapping relationship defined between the format of the raw data and the standardized data format. The mapping relationship may be defined by any mapping rule, and the mapping rule may be set (defined) by mapping configuration XML. The mapping rule may be set individually for each vessel data collection apparatus 1300 provided in the vessel 1000. The mapping configuration XML may be updated remotely from a shore-based management system through the integrated vessel data management apparatus 1100.

The mapping module 1314 inspects the validity of the information extracted through the information extraction program module 1311, and generates vessel data in a standardized data format using the corresponding information. In various embodiments of the present disclosure, the standardized data format may be a JSON format.

In this case, the mapping module 1314 may map the Key/Value (KV) extracted by parsing the raw data to a JSON format, like the embodiment shown in Table 1.

API 1315 plays an interface role of transmitting the vessel data converted to the standardized data format to another device, for example, the integrated vessel data management apparatus 1100. The vessel data collection apparatus 1300 may transmit the vessel data in the standardized data format to the integrated vessel data management apparatus 1100 through the API 1315. In an embodiment, the vessel data collection apparatus 1300 may collect the vessel data in the standardized data format by transmitting to queue through a queue based transmission protocol. In this case, a message exchange protocol between the vessel data collection apparatus 1300 and the integrated vessel data management apparatus 1100 may be an Advanced Message Queing Protocol (AMQP), and the API 1315 may operate as a queue client.

Figure 11:
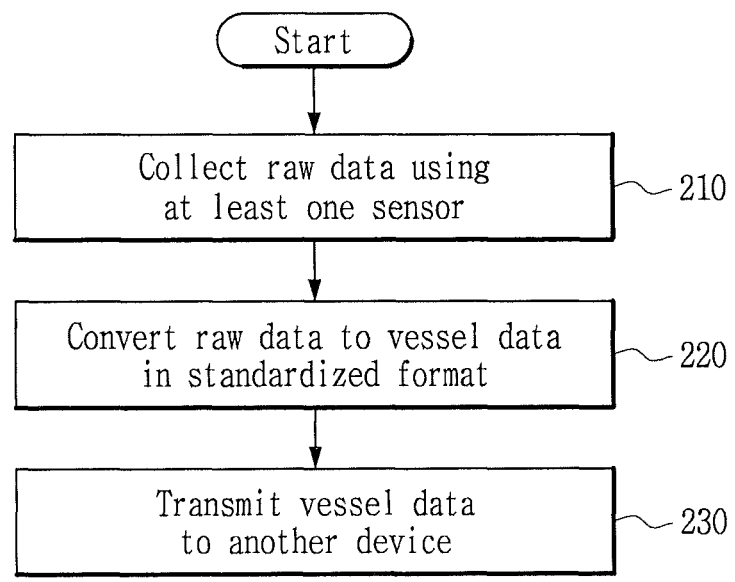
FIG. 11 is a flowchart showing a vessel data collection method according to an embodiment of the present disclosure.

FIG. 11 is a flowchart showing a vessel data collection method according to an embodiment of the present disclosure.

Referring to FIG. 11, the vessel data collection apparatus 1300 according to an embodiment of the present disclosure collects raw data using at least one sensor (210). The raw data is data including information associated with the vessel 1000, and may be collected through at least one sensor.

The vessel data collection apparatus 1300 converts the collected raw data to vessel data in a standardized format (220). In an embodiment, the standardized format may be a JSON format, and in this case, the vessel data collection apparatus 1300 may extract Key/Value by parsing the vessel data, and map the extracted Key/Value to a JSON format (VDM Path/Value).

The vessel data collection apparatus 1300 may transmit the vessel data in the standardized format to at least one device (230). In this instance, the vessel data collection apparatus 1300 may transmit the converted vessel data using a queue based transmit protocol. The device may be an integrated vessel data management apparatus.

Figure 12:
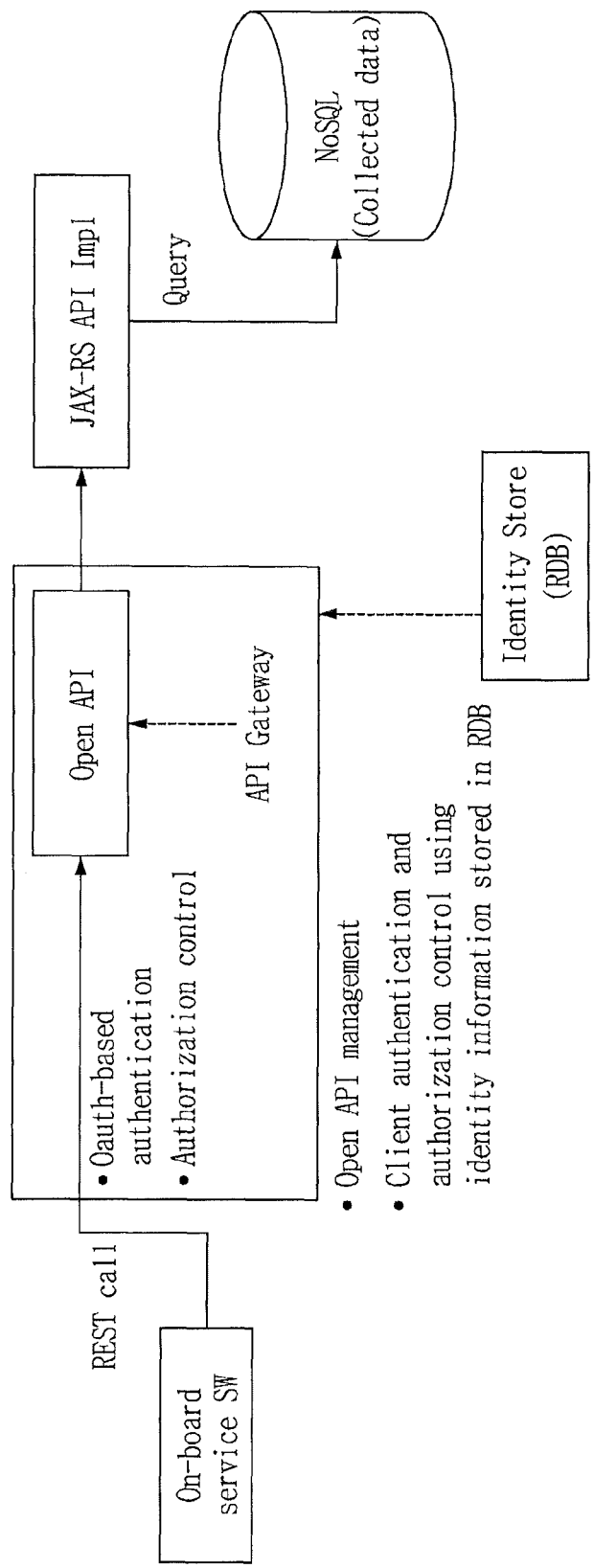
FIG. 12 is a further detailed diagram showing the operation of API gateway according to an embodiment of the present disclosure.

FIG. 12 is a further detailed diagram showing the operation of API gateway according to an embodiment of the present disclosure. The API gateway may perform the operation of standard document generation, management (publishing, etc.), authentication, and authorization control of API. To this end, the API gateway may support API distribution and API developer community management, API traffic routing, API authentication, and authorization control, using API Manager of WSO2.

As shown in FIG. 12, when API developer writes API by defining Swagger based API standards, the corresponding API standard document may be automatically exported as a HTML format document through the API gateway, and the API gateway may manage the transmitted API standard document.

Furthermore, API developer may transmit API implementation generated based on Java API for RESTful Web Service (JAX-RS) servlet to the API gateway. The API gateway may manage the transmitted API implementation separately from open API that publishes it, and perform basic authentication and authorization control on the open API provided based on REST. The open API authentication may be performed based on Oauth, and authentication information may be stored in Relational Data Base (RDB) through Relational Data Base Management System (RDBMS) provided in the integrated vessel data management apparatus 1100. Furthermore, the API gateway may provide API Gateway UI to allow API manager to control the open API authorization.

In various embodiments of the present disclosure, API gateway may provide open API for pushing vessel data to the external device 2000 or allowing the external device 2000 to query vessel data in the integrated vessel data management apparatus 1100.

Specifically, the open API may include API for receiving vessel data from at least one vessel equipment 1200*a*, 1200*b*, 1200*c*, API for allowing a third party service to query vessel data, API for transmitting vessel data to a third party service in real time, API for transmitting vessel data to a shore-based management system, and API for receiving data from a shore-based management system.

The API for receiving vessel data may perform a function to receive vessel data transmitted from at least one vessel equipment 1200a, 1200b, 1200c, and may be implemented to receive the vessel data in batch. In an embodiment, the API for receiving vessel data may be implemented such as "PUT/vessel identification information/vessel equipment identification information" or "PUT/vessel equipment identification information (vessel identification information is processed and reflected as configuration information)". Here, the vessel identification information may be identification information of the vessel 1000 registered in International Maritime Organization, for example, IMO Number (7 digits).

The vessel data query API for a third party service may be implemented as JAX-RS API Impl in Open Service Gateway Interface (OSGI) provided in the integrated vessel data management apparatus 1100, and may be implemented such as "GET/vessel identification information/EquipmentGroup/Equipment/Component/Subcomponent/Sensor" or "/EquipmentGroup/Equipment/Component/Subcomponent (vessel identification information is processed and reflected as configuration information)".

In various embodiments, the vessel data query API for a third party service may be implemented to query/transmit vessel data by the type of sensor, engine, service, component, and vessel equipment. The vessel data query API by sensor may be implemented such as "GET / . . . /Subcomponent/Sensor; GET http://IP:Port/1234567/machinery/engine/RPM", and the vessel data query API by component may be implemented such as "GET / . . . /Subcomponent/*; GET http://IP:Port/1234567/machinery/engine/*". Furthermore, the vessel data query API by service may be implemented such as "GET / . . . /economical sailing/*; GET http://IP:Port/1234567/EconomicNavigation/current".

API may be implemented as a pair of APIs for vessel data transmission and data reception.

In various embodiments of the present disclosure, the integrated vessel data management apparatus 1100 may provide vessel data to another device, for example, a shore-based management system or a third party service device, through the API gateway. Another device may use the received vessel data for an economical sailing system (ENI-RAM) and an additional service (collision avoidance, engine monitoring, etc.).

The integrated vessel data management apparatus 1100 may filter vessel data to provide to a shore-based management system in real time from the collected vessel data using CEP engine provided in the integrated vessel data management apparatus 1100, and immediately transmit the filtered vessel data to the shore-based management system via satellite communication. A filtering rule for filtering vessel data in real time (real-time satellite transmission rule) may be preset in the CEP engine. For example, when dataset of which the filtering rule is generated within 10 seconds is group1 vessel data, the filtering rule may be preset as shown in Table 3.

The integrated vessel data management apparatus 1100 may transmit and receive vessel data in a standardized data format between the integrated vessel data management apparatus 1100 and a shore-based management system, or a JSON format.

Vessel data that is not transmitted to a shore-based management system in real time among the collected vessel data may be stored in NoSQL and transmitted to the shore-based management system according to a periodic processing logic (Near Real, Batch).

The integrated vessel data management apparatus 1100 may transmit the collected vessel data to the topic listener of the OSGI using queue performing data processing in real time. The topic listener may verify and process the vessel data in JSON format according to a rule stored in rule engine. The topic listener may process push data in the vessel data and transmit it to API gateway using Push API implementation, and the API gateway may transmit the Push API implementation to a third party service.

Figure 13:
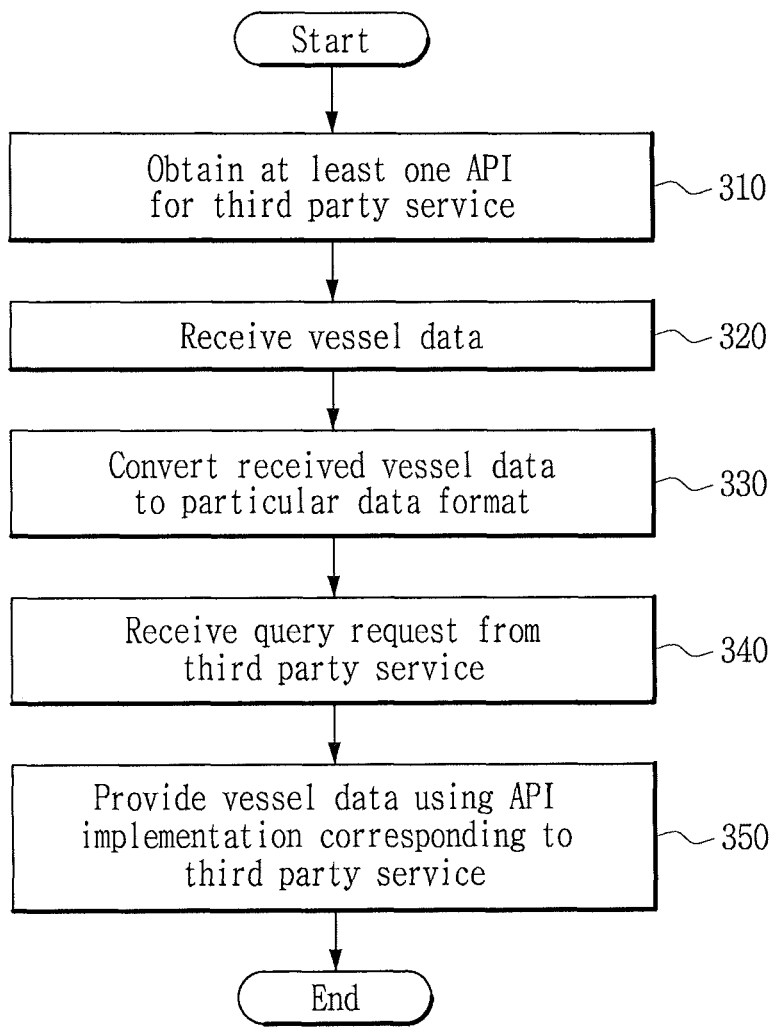
FIG. 13 is a flowchart showing a vessel data providing method according to an embodiment of the present disclosure.

FIG. 13 is a flowchart showing a vessel data providing method according to an embodiment of the present disclosure.

Referring to FIG. 13, the integrated vessel data management apparatus 1100 according to an embodiment of the present disclosure store at least one API for a third party service (310). The integrated vessel data management apparatus 1100 may obtain at least one API for transmitting and receiving vessel data through API gateway, and manage it. The integrated vessel data management apparatus 1100 may perform API standard document generation, API implementation generation, and authentication and authorization control for them through API gateway.

The integrated vessel data management apparatus 1100 receives vessel data from at least one vessel equipment 1200a, 1200b, 1200c (320).

The integrated vessel data management apparatus 1100 converts the received vessel data to a particular data format (330). In various embodiments, the integrated vessel data management apparatus 1100 may transmit the converted vessel data to a shore-based management system through real-time data analysis, or provide pre-requested vessel data to a third party service using API Push implementation.

Furthermore, in an embodiment, when a query request for at least a part of the vessel data is received from a third party service (340), the integrated vessel data management apparatus 1100 may control API gateway to provide vessel data corresponding to the query request to the third party service through API's Java API for RESTful Web Service (JAX-RS) API implementation corresponding to the third party service (350).

In various embodiments of the present disclosure, the integrated vessel data management apparatus 1100 may be a central management device or at least one vessel equipment with a vessel data integration platform.

The central management device with the vessel data integration platform may include all devices that perform a role in collecting vessel data from at least one vessel equipment, integrating/managing it and providing it to an external device.

The at least one vessel equipment is various types of equipment mounted on the vessel in an aim of collecting vessel data, and may include all equipment capable of transmitting information collected using at least one sensor to a central management device. The vessel data may various types such as text, audio and image.

The at least one vessel equipment collects raw data using the sensor and transmits it to the central management device. The raw data refers to data in various formats collected by the vessel equipment from the sensor. In general, the vessel equipment may be classified into an integrated vessel data management apparatus manufacturer's own vessel equipment (Type 1 vessel equipment) and a third party's vessel equipment (Type 2 vessel equipment).

The central management device may collect vessel data from at least one vessel equipment. The central management device may not have a separate sensor or directly generate raw data by using at least one vessel equipment as gateway for collecting vessel data.

Figure 14:
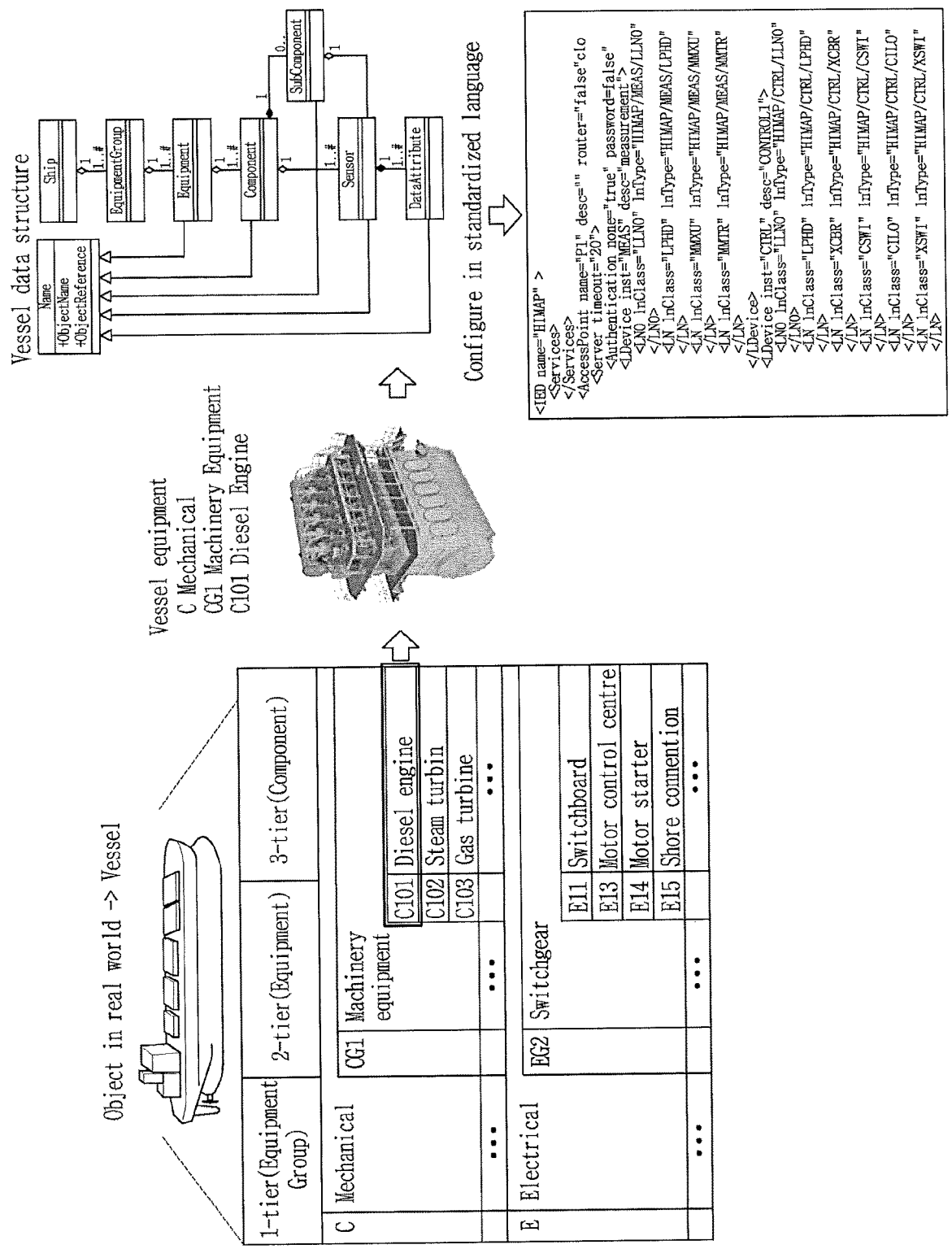
FIG. 14 is a conceptual diagram illustrating a vessel data model according to an embodiment of the present disclosure.

The integrated vessel data management apparatus 1100 according to an embodiment of the present disclosure uses a vessel data model (VDM) in the above operation. As shown in FIG. 14, the vessel data model is a data model for standardizing and defining all data associated with the vessel, and objectizes all devices ranging from the vessel itself to the end sensor and defines a relationship between objects and attribute of the objects. The integrated vessel data management apparatus 1100 according to an embodiment of the present disclosure uses the vessel data model in a manner of sharing a predefined vessel data model configuration file as a document in which the structure of the vessel is intuitively organized and applying it to the vessel data.

The vessel data model configuration file includes metadata for defining information of each real vessel based on the vessel data model, and may be written in Vessel Data Model Configuration Description Language (VCL). In various embodiments, the vessel data model configuration description language may be Extensible Markup Language (XML), and in this case, the vessel data model configuration file may be referred to as VDM Configuration XML.

Figure 15:
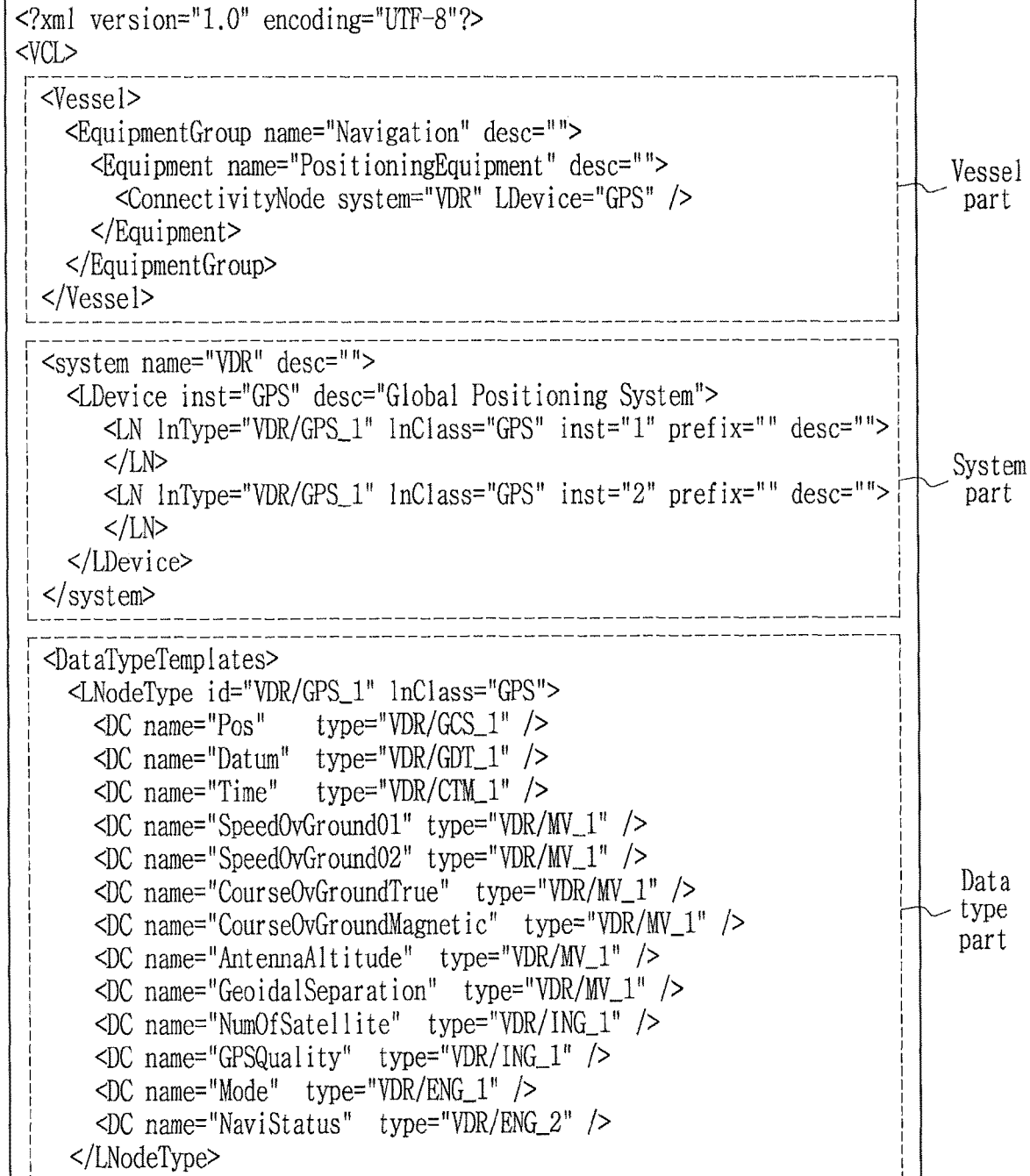
FIG. 15 is a diagram showing an example of a vessel data model setting file.
Figure 16:
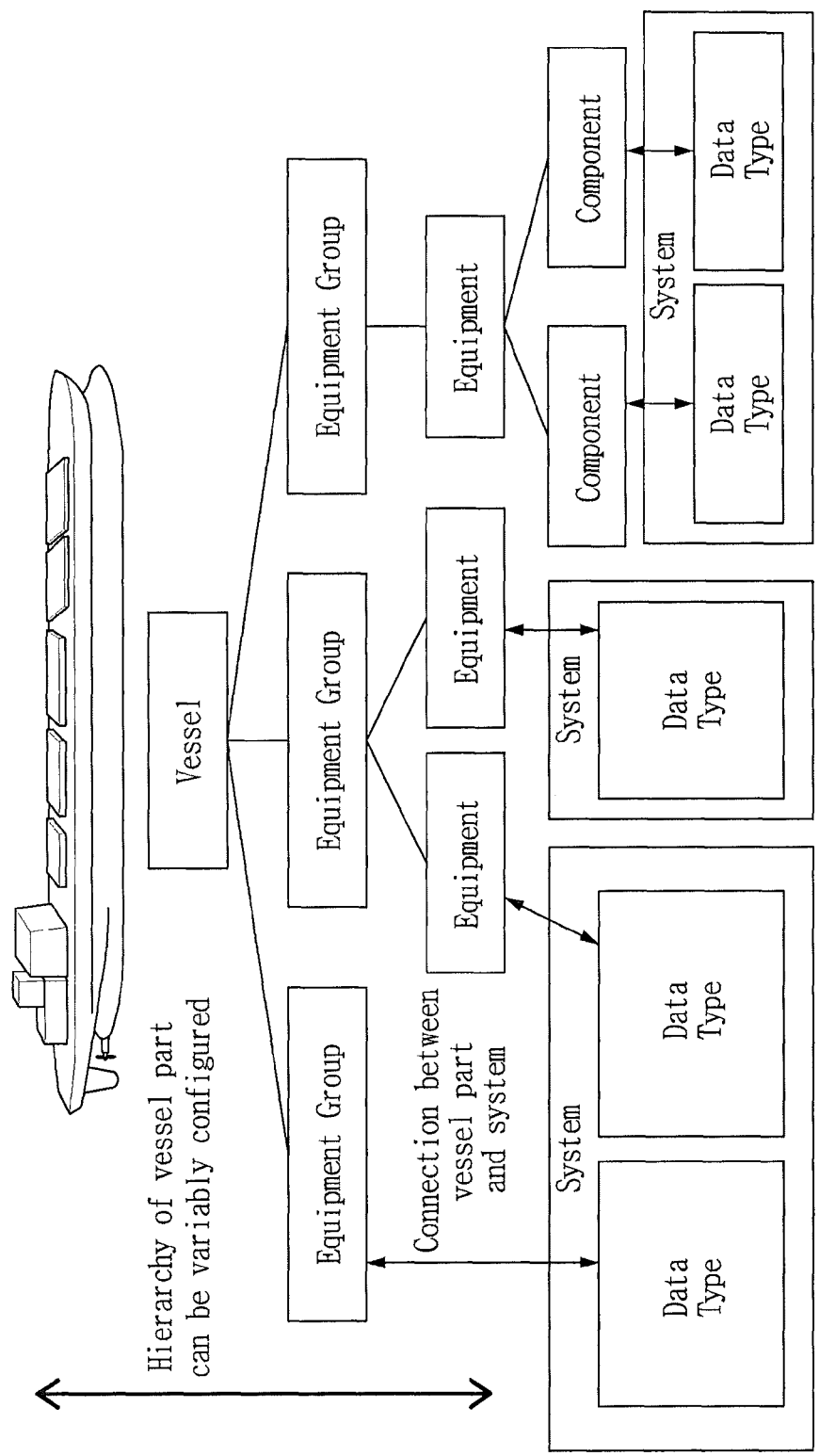
FIG. 16 is a diagram showing a tree structure of a vessel data model setting file.

Referring to FIG. 15, the vessel data model configuration file may largely include vessel part, system part and data type part, and as shown in FIG. 16, each part may be connected as a tree structure including multiple nodes. The vessel part is a part describing the arrangement structure of vessel equipment (physical equipment) in the vessel, and as shown in FIG. 16, may hierarchically define vessel equipment by systematic classification. The system part is a part defining a system that collects vessel data generated from vessel equipment in the vessel, and as shown in FIG. 16, may include data type part. The data type part is a part describing the structure and attribute of the collected vessel data. Referring to FIG. 16, each node of the vessel part may be connected with a particular data type node of the system part, and the data node may be defined and recursively structured by the data type.

In various embodiments, a shore-based management system may remotely update the vessel data model configuration file by transmitting information associated with the vessel data model setting file to the integrated vessel data management apparatus 1100. A plurality of integrated vessel data management apparatuses 1100 shares the updated vessel data model setting file to enable data integration based on common vessel data model.

To apply the vessel data model, vessel data in a format (non-standard format) to which the vessel data model is not applied, i.e., non-standardized vessel data (identical to or different from raw data) should be converted to vessel data in a format (standard format) to which the vessel data model is applied, i.e., vessel data in a standardized data format. The integrated vessel data management apparatus 1100 may convert non-standardized vessel data to a standardized data format using the vessel data model, and store/manage it.

To this end, the vessel data model according to an embodiment of the present disclosure defines a mapping relationship between a non-standard format and a standard format. The mapping relationship may be defined by a mapping configuration file, and may be implemented as a mapping program that provides a mapping tool to the user of the integrated vessel data management apparatus 1100.

In various embodiments of the present disclosure, the integrated vessel data management apparatus 1100 extracts key and value from vessel data in a non-standard format for converting (mapping) of the vessel data. Subsequently, the integrated vessel data management apparatus 1100 may extract VDM Path and Data Attribute from the vessel data model setting file.

The VDM Path may be referred to as identification information of vessel data, and represents a path designating rule for pointing to particular vessel data on the vessel data model. The VDM Path may be allocated to each vessel equipment by the vessel data model setting file. Accordingly, the integrated vessel data management apparatus 1100 may identify each vessel data according to the VDM Path in transmitting and receiving vessel data based on the vessel data model.

The VDM Path may be separately defined as a value for collecting vessel data and a value for providing vessel data. The VDM Path for collecting vessel data is for identifying vessel data between the integrated vessel data management apparatuses 1100, and may reflect the hierarchy of the system part and the data type part. The VDM Path for providing vessel data is for identifying vessel data between the integrated vessel data management apparatus 1100 and an external device (for example, a shore-based management system, a third party service, etc.), and may reflect the hierarchy of the vessel part. The range of data hierarchically changes depending on the hierarchy level of the VDM Path for providing vessel data, and a set of VDM Path necessary to provide fittingly to a particular third party service may be managed. In case that vessel data is provided to a shore-based management system, the VDM Path may include vessel IMO.

The Data Attribute may be referred to as attribute information of vessel data, and defines attributes the value of vessel data should have. The validity of the value extracted from the non-standard vessel data is verified according to attribute defined in Data Attribute corresponding to the corresponding vessel equipment.

The integrated vessel data management apparatus 1100 may map the extracted key to VDM Path according to the mapping relationship, and map the validity verified value to a standardized data format. In an embodiment, the vessel data in non-standard format may be in NMEA (National Marine Electronics Association) format. In an embodiment, the standardized data format may be JSON (JavaScript Object Notation) format.

The integrated vessel data management apparatus 1100 may provide the converted vessel data to at least one external device (for example, a shore-based management system or a third party service device inside and outside the vessel) through an artificial satellite or standardized Application Programming Interface (API). As the external device, the third party service device may be any device with a third party software (on-board service software) using vessel data.

The integrated vessel data management apparatus 1100 according to an embodiment of the present disclosure may provide and manage API for transmitting and receiving data including the vessel data with an external device or allowing an external device to query vessel data in the integrated vessel data management apparatus 1100.

The integrated vessel data management apparatus 1100 according to an embodiment of the present disclosure may collect vessel data using the vessel data model, convert vessel data in a non-standard format to vessel data in a standardized data format, or provide vessel data in a standardized data format to an external device. In this case, a detailed operation of the integrated vessel data management apparatus 1100 is based on the vessel data model, and is described as below with reference to FIG. 17.

Figure 17:
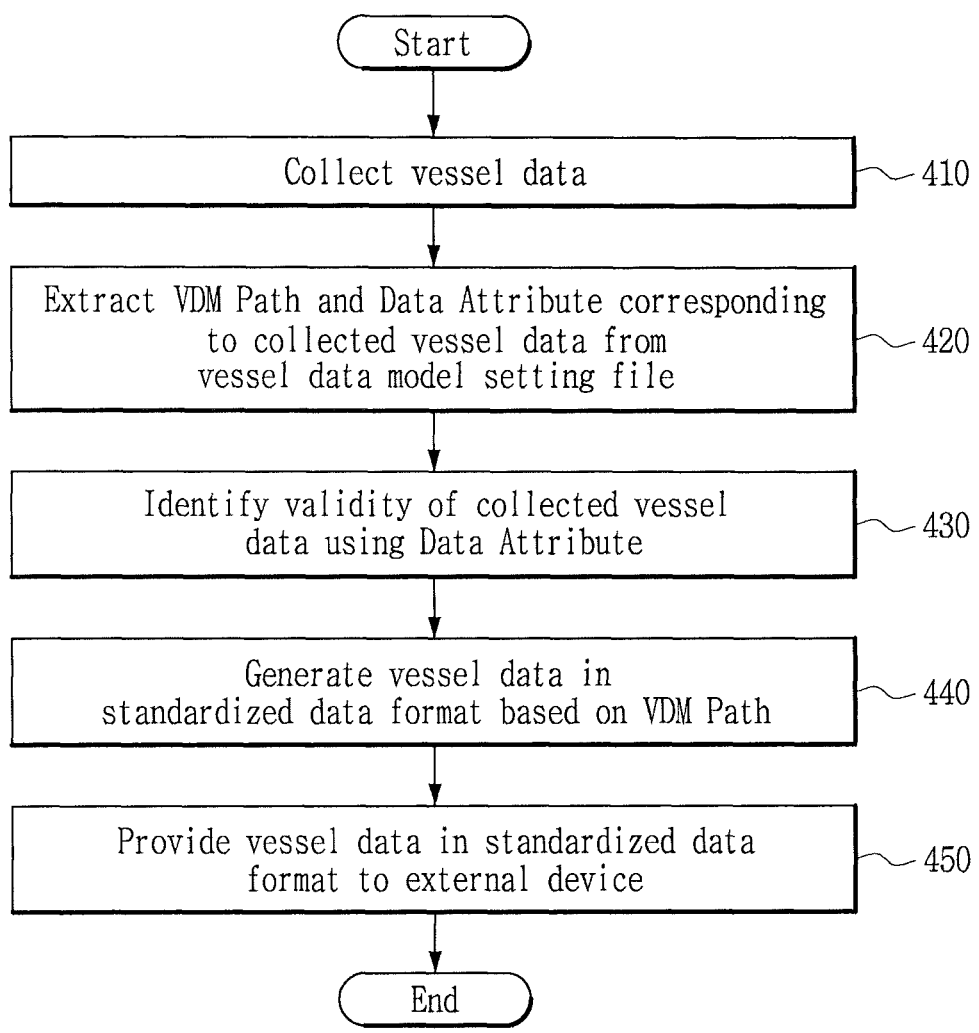
FIG. 17 is a flowchart showing an integrated vessel data management method to which a vessel data model according to an embodiment of the present disclosure is applied.

FIG. 17 is a flowchart showing an integrated vessel data management method to which the vessel data model according to an embodiment of the present disclosure is applied.

Referring to FIG. 17, the integrated vessel data management apparatus 1100 according to an embodiment of the present disclosure collects vessel data from at least one vessel equipment (410). The collected vessel data is data in a non-standard format, may include raw data. The integrated vessel data management apparatus 1100 extracts the collected vessel data VDM Path and Data Attribute (420). The Data Attribute extracted from the integrated vessel data management apparatus 1100 may include key and value.

The integrated vessel data management apparatus 1100 identifies the collected vessel data based on the VDM Path, and identifies the validity of the extracted Data Attribute using a vessel data model configuration file according to the identified results (430).

Subsequently, the integrated vessel data management apparatus 1100 maps the Data Attribute to a standardized data format to generate vessel data in a standardized data format (440).

Furthermore, the integrated vessel data management apparatus 1100 may provide the vessel data in the standardized data format to an external device (450).

Those having ordinary skill in the technical field pertaining to the present disclosure will appreciate that various modifications and changes may be made without departing from the essential nature of the present disclosure. Furthermore, the embodiments disclosed in the specification and drawings are only a particular embodiment presented to easily describe the disclosure and help the understanding of the present disclosure, but are not intended to limit the scope of the present disclosure. Therefore, it should be interpreted that the scope of the present disclosure cover the embodiments disclosed herein as well as all modified or changed forms derived based on the technical spirit of the present disclosure.

INDUSTRIAL APPLICABILITY

According to the embodiments, vessel data collected from various vessel IT equipment can be standardized and integratedly managed, and provided to a shore-based management system or a third party service inside/outside the vessel.

Furthermore, a standardized platform for vessel data is provided to allow ship-owners and ship companies to conveniently use the vessel data.

Furthermore, vessel data can be provided to a shore-based management system in real time or provided as push data to a third party service.

Furthermore, the standard for collecting various vessel data and transmitting it to a third party service can be provided.

Furthermore, in case that a new sensor or new vessel equipment is added to the vessel, the vessel data model can be easily expanded only by changing the vessel equipment level.

Furthermore, vessel data collected from various vessel data collection apparatuses is standardized and outputted, and thus the vessel data can be integratedly managed and provided to a shore-based management system or a third party service inside/outside the vessel.

The invention claimed is:

1. An integrated vessel data management method, comprising:
   collecting vessel data relating to the vessel from at least one vessel equipment;
   converting the collected vessel data to a standardized digital data format by using an integrated vessel data management apparatus to apply a vessel data model (VDM) to standardize and define data associated with the vessel equipment, wherein the VDM defines a mapping relationship between a non-standardized format and the standardized digital data format, the mapping relationship being defined by a VDM configuration file that provides a mapping tool to a user of the integrated vessel data management apparatus, said VDM configuration file including metadata for defining information of each vessel based on the VDM, including a vessel part describing the structure of the at least one vessel equipment and hierarchically defining vessel equipment by systematic classification, a system part defining a system that collects the vessel data from the at least one vessel equipment, and a data type part describing the structure and attribute of the collected vessel data; and
   transmitting the converted vessel data in the standardized digital data format to an external device,
   wherein the integrated vessel data management apparatus identifies each vessel data according to a VDM Path in transmitting and receiving vessel data based on the VDM, the VDM Path representing a path designating rule for pointing to particular vessel data on the VDM.

2. The integrated vessel data management method according to claim 1, wherein the standardized digital data format is Javascript Object Notation (JSON) format.

3. The integrated vessel data management method according to claim 2, wherein the converting to the standardized digital data format comprises: extracting Key and Value by parsing the collected vessel data; and mapping the extracted Key and Value to the JSON format.

4. The integrated vessel data management method according to claim 3, wherein the mapping comprises: receiving input of setting information for the mapping through the mapping tool; mapping the extracted Key and Value to the JSON format based on the setting information; and outputting the mapping results in real time through the mapping tool.

5. The integrated vessel data management method according to claim 1, wherein the collected vessel data is in National Marine Electronics Association (NMEA) format.

6. An integrated vessel data management apparatus, comprising:
   a communication unit configured to transmit and receive vessel data relating to the vessel to and from external devices;
   data collection apparatus for collecting the vessel data relating to the vessel from at least one vessel equipment; and
   a control unit configured to take control of the data collection apparatus to collect said vessel data from at least one vessel equipment, convert the collected vessel data to a standardized digital data format, and transmit the converted vessel data to an external device through the communication unit;
   wherein the control unit is configured to convert the collected vessel data to the standardized digital data format by applying a vessel data model (VDM), wherein the VDM defines a mapping relationship between a non-standardized format and the standardized digital data format, the mapping relationship being defined by a VDM configuration file that provides a mapping tool to a user of the integrated vessel data management apparatus, said VDM configuration file including metadata for defining information of each vessel based on the VDM, said VDM including a vessel part describing the structure of the at least one vessel equipment, a system part defining a system that collects the vessel data from the at least one vessel equipment, and a data type part describing the structure and attribute of the vessel data; and wherein the integrated vessel data management apparatus is configured to identify each vessel data according to a VDM Path in transmitting and receiving vessel data based on the VDM, the VDM Path representing a path designating rule for pointing to particular vessel data on the VDM.

7. The integrated vessel data management apparatus according to claim 6, wherein the standardized digital data format is Javascript Object Notation (JSON) format.

8. The integrated vessel data management apparatus according to claim 7, wherein the control unit includes an adapter to extract Key and Value by parsing the collected vessel data and map the extracted Key and Value to the JSON format.

9. The integrated vessel data management apparatus according to claim 8, wherein the control unit takes control to receive input of setting information for the mapping through the mapping tool, map the extracted Key and Value to the JSON format based on the setting information, and output the mapping results in real time through the mapping tool.

10. The integrated vessel data management apparatus according to claim 6, wherein the collected vessel data is National Marine Electronics Association (NMEA) format.

11. An integrated vessel data management method, comprising:

collecting vessel data relating to the vessel from at least one vessel equipment;

generating vessel data in a standardized digital data format from the collected vessel data by using an integrated vessel data management apparatus to apply a predefined vessel data model (VDM) to standardize and define data associated with the vessel equipment, wherein the VDM defines a mapping relationship between a non-standardized format and the standardized digital data format, the mapping relationship being defined by a VDM configuration file that provides a mapping tool to a user of the integrated vessel data management apparatus, said VDM configuration file including metadata for defining information of each vessel based on the VDM, including a vessel part describing the structure of the at least one vessel equipment and hierarchically defining vessel equipment by systematic classification, a system part defining a system that collects the vessel data from the at least one vessel equipment, and a data type part describing the structure and attribute of the collected vessel data; and providing the vessel data in the standardized data format to an external device, wherein the integrated vessel data management apparatus identifies each vessel data according to a VDM Path in transmitting and receiving vessel data based on the VDM, the VDM Path representing a path designating rule for pointing to particular vessel data on the VDM.

12. The integrated vessel data management method according to claim 11, wherein the VDM is defined by a vessel data model setting file.

13. The integrated vessel data management method according to claim 12, wherein the vessel data model setting file is written in XML.

14. The integrated vessel data management method according to claim 12, wherein the generating of the vessel data in the standardized digital data format comprises: extracting identification information and attribute information corresponding to the collected vessel data from the vessel data model setting file; verifying the validity of the collected vessel data using the attribute information; and mapping the collected vessel data to the standardized digital data format using the identification information.

* * * * *

UNITED STATES PATENT AND TRADEMARK OFFICE
CERTIFICATE OF CORRECTION

PATENT NO. : 11,072,403 B2
APPLICATION NO. : 15/577219
DATED : July 27, 2021
INVENTOR(S) : Cheong et al.

Page 1 of 1

It is certified that error appears in the above-identified patent and that said Letters Patent is hereby corrected as shown below:

On the Title Page

At Page 2, Column 1:
(30) Foreign Application Priority Data
Change:
"Jun. 5, 2015 (KR) ............KR10-2015-0080179
May 28, 2016 (KR) .................10-2015-0075324"
To:
--Jun. 5, 2015 (KR) .................10-2015-0080179
May 28, 2015 (KR) .................10-2015-0075324--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*